US006287358B1

(12) United States Patent
Mason et al.

(10) Patent No.: US 6,287,358 B1
(45) Date of Patent: Sep. 11, 2001

(54) COAL ASH AS SOIL AMENDMENT TO ENHANCE WATER BALANCE, GROWTH, AND HARVESTING OF TURFGRASSES

(76) Inventors: Jack Mason, c/o Mason's Tree & Turf Farm, 905 Sand Bar Ferry Rd., Beech Island, SC (US) 29841; Domy Adriano, c/o Head, Biogeochemical Ecology Division, Savannah River Ecology Lab, Drawer E, Aiken, SC (US) 29802

(*) Notice: Subject to any disclaimer, the term of this patent is extended or adjusted under 35 U.S.C. 154(b) by 0 days.

(21) Appl. No.: 09/209,452

(22) Filed: Dec. 11, 1998

(51) Int. Cl.[7] ..................................................... C05D 3/04
(52) U.S. Cl. ............................... 71/62; 71/903; 706/900; 706/DIG. 1
(58) Field of Search ............... 71/62, 903; 264/DIG. 49; 106/DIG. 1, 900; 47/58, DIG. 10

(56) References Cited

U.S. PATENT DOCUMENTS 5,481,827 * 1/1996 Decker ........................................ 47/58
5,627,133 * 5/1997 Nelson ...................................... 504/116

FOREIGN PATENT DOCUMENTS

1057622 * 11/1983 (SU).

OTHER PUBLICATIONS

Buck et al, "Direct revegetation of Anthracite refuse using coal fly ash as a major soil amendment", 1988 mine Drainage and Surface Mine Reclamation Conference. pp. 236–245. Apr. 1988.*
Scana Insights; Winter 1997, Scana Corporation; SCE & G project helps nurture new growth; pp. 5–7.
Water Right (Conserving Our Water Preserving Our Environment; Water Everywhere; By Dr. H. Marc Cathey; pp. 2–65.
Share the Water; Ensure Adequate Water For a Balanced Environment and a Stable Economy.
TPI Associatation News, "Water Practices and Proceedings From All Across the Globe Now Needed by Water Committee".
Personal Perspective (Observations and Opinions of a TPI Board Member: By Art Campbell, Board Member;"Everyone says something must be done, and it looks likes i will be us."
Water convservation through technology: By Luke Frank; Landscape and Irrigation, Sep. 2000.
Water restrictions; US Drought Impacts, Dec. 8, 2000–Jan. 7, 2001.
Drought Impact News; Georgia; US Drought Impacts, Dec. 8, 2000–Jan. 7, 2001.
Mower Heaven: By Jerry Roche, Landscape and Irrigation, Dec. 2000.
Georgia Turgrass Association Today; Jan./Feb. 2001; vol. 16, No. 1.
Metro; Expert Warns of Third Year of Drought; By Lee Shearer; Morris News Services, The Augusta Chronicle.
Metro; Lack rain would cause water limits; By Jason B. Smith; Staff Writer, The Augusta Chronicle.
Metro; Drought kills campus trees By Lee Shearer; Morris News Service, The Augusta Chronicle.

(List continued on next page.)

Primary Examiner—Steven P. Griffin
Assistant Examiner—Maribel Medina
(74) Attorney, Agent, or Firm—Armstrong, Westerman, Hattori, McLeland & Naughton, LLP

(57) ABSTRACT

A method of growing turfgrass wherein a relatively large amount of precipitator coal fly ash is applied to an existing soil and a turfgrass is established thereon. The coal fly ash is weathered before or after application to the existing soil. A field employing a treated soil layer is also provided having improved soil characteristics which are particularly beneficial in the growth, harvest, and shelf life of turfgrasses.

9 Claims, 12 Drawing Sheets

OTHER PUBLICATIONS

Albuquerque, New Mexico; Feb. 5–9, 2001; Turfgrass producers International; Midwinter Conference & Expo.

J.J. Bilski, A. K. Alva, and K.S. Sajwan; "*Fly Ash*", Chapter 9, pp. 328–363, 1995.

J. Environ. Qual., vol. 6, No. 3, 1977, pp. 267–270.

J. Environ. Qual., vol. 7, No. 3, 1978, pp 416–421.

J. Environ. Quality, vol. 1, No. 2, 1972, pp. 186–189.

Environmental Sciences and Technology; vol. 9, No. 3, Mar. 1975, pp 258–261.

S. Cervello, G. Petruzzelli and A. Perna; "*Fly Ashes as an Emendment in Cultivated Soils,*" pp. 331–338.

Environmental Sciences & Technology; vol. 11, No., 13, Dec. 1977, pp. 1194–1201.

J. Agric. Food Chem. vol. 24, No. 4, 1976, pp 885–888.

H.T. Phung et al; "*Potential Use of Fly Ash as a Liming Material*"; pp. 504–515.

J. Environ. Qual., vol., 7, No. 3, 1978, pp. 416–421.

Soil Sci. Amer. Proc., vol. 38, 1974, pp 974–977.

J. Environ., Qual., vol. 9, No. 3, 1980, pp. 424–428.

R.F. Korcak; "Utilization of Coal Combustion By–Products in Agriculture and Horticulture"; pp. 109–130.

R.B. Clark et al; Coal Combustion By–Product Use on Acid Soil: Effects on Maize Growth and Soil pH and Electrical Conductivity; pp. 133–155.

J. Environ. Qual. 22:227–247 (1993).

J. Environ. Qual., vol. 9, No. 3, 1980, pp. 333–344.

\* cited by examiner

COAL ASH AS SOIL AMENDMENT TO ENHANCE WATER BALANCE, GROWTH, AND HARVESTING OF TURFGRASSES

BACKGROUND OF INVENTION

1. Field of Invention

The invention relates to use of coal fly ash in the growth and harvesting of turfgrasses.

2. Description of the Related Art

The use of coal to produce electric power or steam requires large quantities of coal annually. In the U.S., coal is the most extensively used and most important source of energy, and will most likely continue to be so for the foreseeable future. The combustion of coal results in the production of vast quantities of coal combustion by-products (CCBPs) which must be disposed. CCBPs are classified into three general types of ash: fly ash, bottom ash and boiler slag. Currently, the most widely accepted disposal practices are landfilling and storage in settling ponds. Only about 25% of the solid residues from coal combustion, i.e. fly-ash and bottom ash, is utilized. Main uses include partial substitution in cement mixes, structural fills, and road base. The low usage ensures that vast amounts of CCBPs are accumulating in disposal facilities, unutilized.

The expense associated with disposal is ever increasing. The expense is primarily associated with the escalating cost of constructing new state-of-the-art landfills. About 70% of power generating facilities utilize landfilling and impoundments as disposal techniques, due to the limited utilization of CCBPs. Thus, there is an incentive to explore other uses of coal fly ash to reduce or eliminate the cost of disposal.

Due to the rather low usage of CCBPs, research is now addressing new usage options which could utilize a greater percentage of the total material produced. Large scale application on lands has been proposed as a promising utilization option. For example, fly-ash has been demonstrated effective in reclaiming acid mine spoils. Because of the liming potential of certain fly-ashes and their ability to provide essential nutrients for plant nutrition, CCBPs are being considered for amending agricultural soils to improve both chemical and physical properties. However, the quantities of CCBPs utilized in mine spoil reclamation can far exceed those suitable for cropland application. Reported benefits of adding fly-ash to problem soils include: enhanced texture for coarse and fine textured soils, improved water holding capacity, and increased pH in acidic soils. Because of the dominance of silt-size particles in fly-ash, this material may often be substituted for topsoil in surface mine lands, thereby enhancing the physical conditions of the soil, especially the water holding capacity.

Application of CCBPs to agricultural lands has both advantages and disadvantages. For example, application of certain fly ashes can increase pH. However, the pH enhancement caused by alkaline fly-ash may cause plant nutrient imbalance, particularly P deficiency and antagonistic reactions among elements because of excessive Ca, K, and S. On the other hand, certain fly-ashes with some unburned coal could produce acidic constituents through the oxidation of pyrite (i.e., $FeS_2$). This oxidation serves to lower soil pH and facilitate the solubility of many trace elements. The solubility of salts in fly-ash particles may cause salinity problems in soils resulting in increases of electrical conductivity in soils, which may retard plant growth, especially in semi-arid and arid conditions. The net effect of fly-ash in soil due to changes in soil pH, salinity, and trace element concentrations could affect both the plant and soil chemical characteristics.

Excessive application rates can result in phytotoxic levels of B, and elevated levels of As, Mo, and Se in plant tissues. Nevertheless, B accumulation in corn (*Zea mays*) as supplied by additions of fly-ash and flue gas desulfurization (FGD) have been reported. Of greatest concern in the long-term usage of fly-ash is the lingering effect of especially Mo and Se and their eventual bioaccumulation in plant tissues. While these elements do not generally produce detrimental effects in plant growth, they are of great concern in animal nutrition as their safe range is very narrow. Because of the potential tainting of the food chain by such trace elements as Mo and Se in the form of feedstuff grown on fly-ash amended soils, the possibility of risk to livestock health should be embodied in the long-range planning for agricultural production purposes.

Some soil physical and related properties have been enhanced by the use of CCBPs with a concomitant increase in aeration and reduced bulk density from the application of silt-sized CCBPs. Although enhancement of water holding capacity of some soils has been reported due to CCBPs application, it continues to be unclear whether this beneficial effect translates directly into increased available water for plant use. In a recent field study, however, banding of ash into the soil at a 45-degree angle to the surface produced increases in corn yield, apparently due to the increased water holding capacity with ash-banded soils. In applying large quantities of CCBP, special consideration should also be given to potential effects on groundwater quality.

Due to the fact that the application of certain fly-ashes, especially at high rates, can potentially affect the quality of the plant material, including crops, other innovative applications need to be explored.

Application of CCBPs generally is regulated by individual states under solid waste regulations developed within the guidelines of the Resource Conservation and Recovery Act (RCRA) of 1976. These regulations vary from very stringent to total exemption from regulation for onsite disposal. For example, in the state of South Carolina, the CCBPs regulation comes under "Solid Waste Management: Land Application of Solid Waste" promulgated in 1996 (SCDHEC, 1996). This regulation addresses the land application of non-hazardous solid waste on, or into, land that is managed to produce crops or forest products and to applications of solid waste on land that is being reclaimed to enhance its aesthetic value or reduce environmental degradation. Further, the land application of non-hazardous solid waste shall be for beneficial agricultural, silvicultural, and horticultural purposes and not used as a means of disposal. The CCBP use falls under "Class I Solid Waste" that refers to those solid wastes, which have the potential to add some nutrient and/or pH adjustment benefit to the soil. These regulations must adhere to all federal, state, and local zoning, land use and other applicable ordinances, regulations, and laws. An important provision of the SCDHEC regulation deals with ceilings for cumulative lifetime loads of the following eight metals: As=41, Cd=39, Cu=1, 500, Pb=300, Hg=17, Ni=420, Se=100, and Zn=2,800 kg $ha^{-1}$.

There are a number of U.S. patents which propose use of coal products for soil conditioning. U.S. Pat. No. 4,985,065 discloses a soil conditioner mainly for improving water retention which includes coal ash.

U.S. Pat. No. 5,013,349 discloses a soil conditioner which employs coal ash as a filler.

U.S. Pat. No. 3,900,378 provides an insoluble swellable polymer comprised of a mixture of a hydrogel and an inert filler which can be coal dust. The mixture can be used as a soil amendment.

U.S. Pat. Nos. 5,248,327 and 4,541,857 disclose soil conditioners using coal-derived products, such as humic acid or a particulate coal.

A coal ash fertilizer composition is disclosed in U.S. Pat. No. 4,469,503.

Although some of the above patents disclose use of coal or coal ash, the amounts of coal ash utilized is relatively low, and other components are required which increases the cost of the soil conditioners.

There remains a need to find suitable and innovative uses of CCBPs which are relatively inexpensive, and which can meet current government regulations.

SUMMARY OF THE INVENTION

It is an object of the patent invention to provide an acceptable alternative use of CCBPs. In particular, the invention utilizes coal fly ash to improve growth and harvesting of turfgrasses.

It is another object of the invention to provide an improved turfgrass field such as an athletic field, golf course, or the like.

It is another object of the invention to improve the shelf life of harvested turfgrasses.

BRIEF DESCRIPTIONS OF THE DRAWINGS

The above and other objects of the invention will become more evident from the detailed description of the invention when read in conjunction with the drawings, wherein.

Figure 8A:
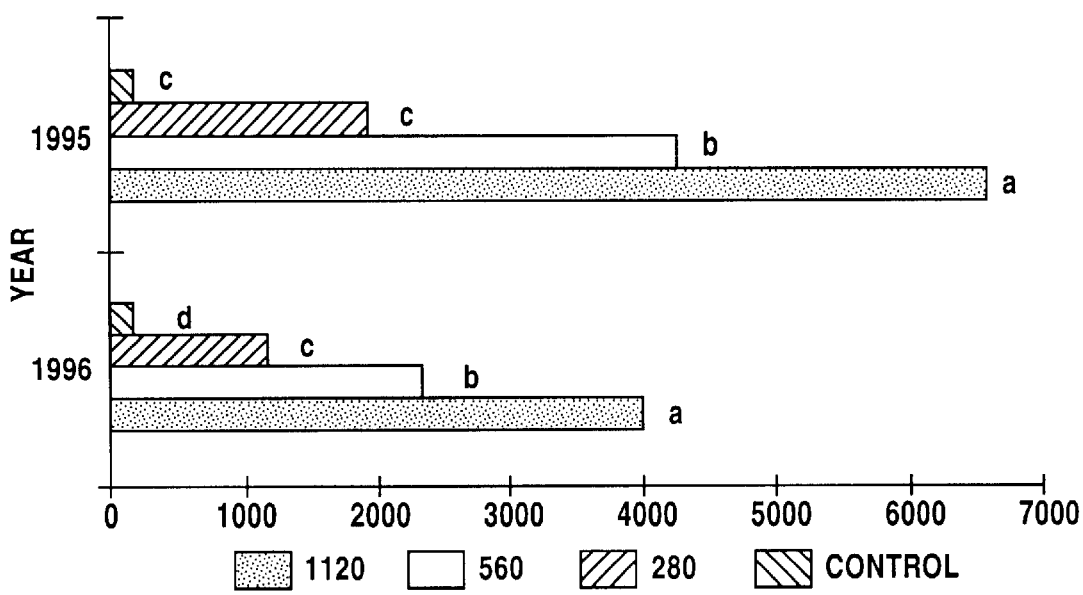
Figure 8B:
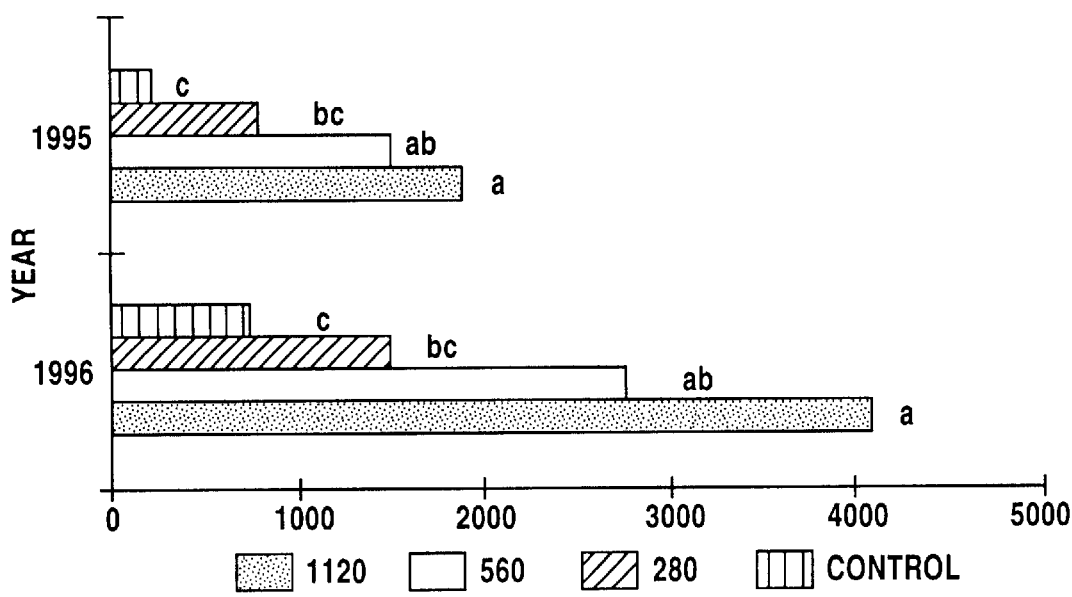
Figure 9A:
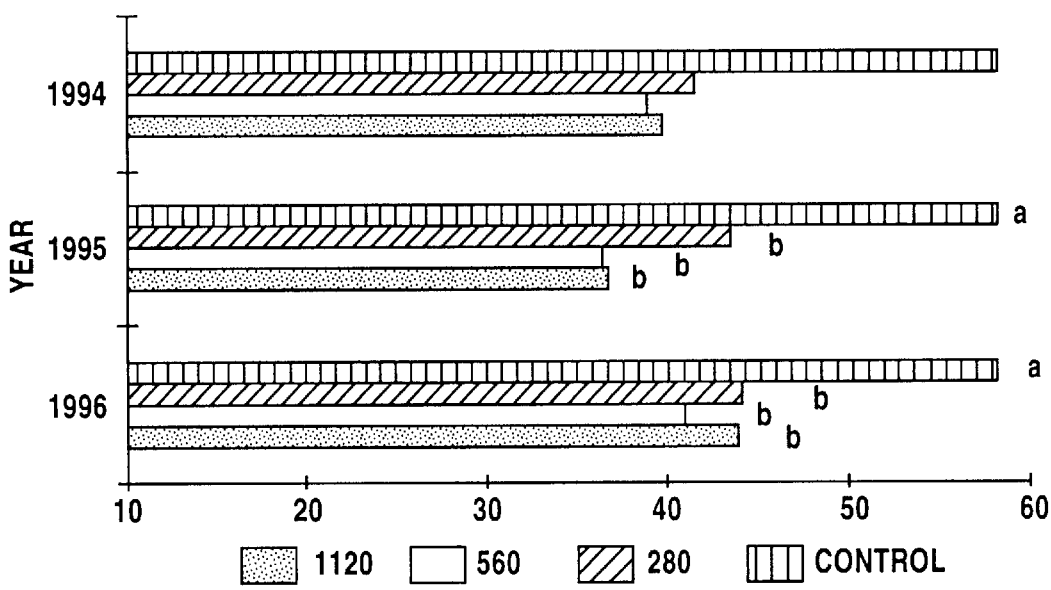
Figure 9B:
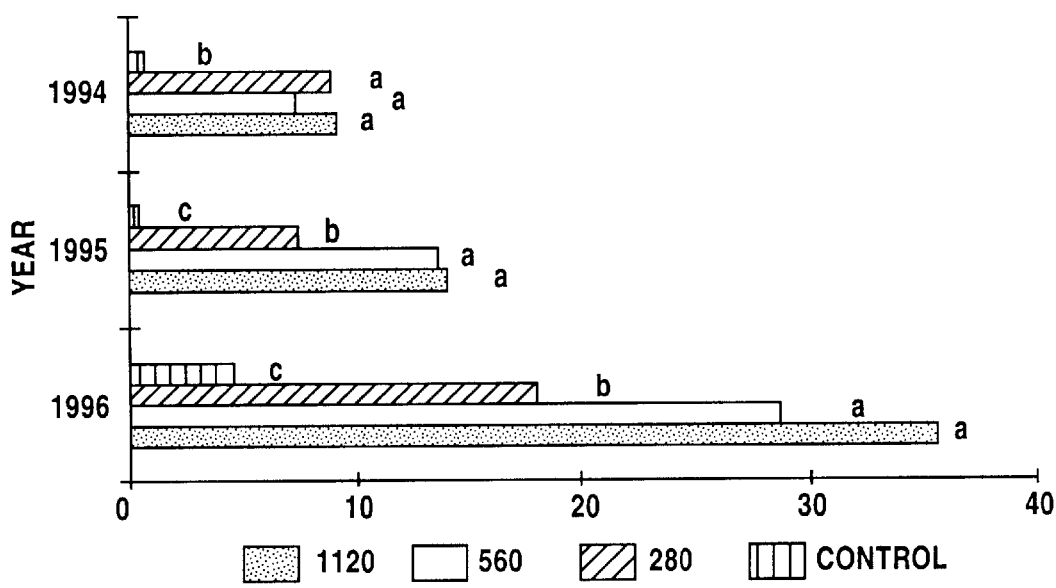
Figure 10A:
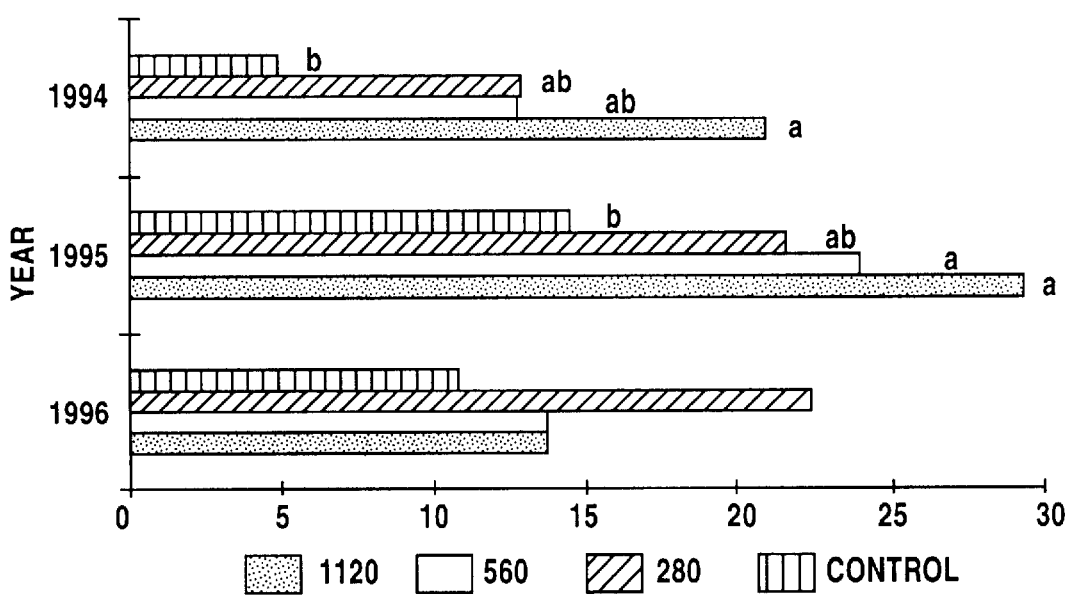
Figure 10B:
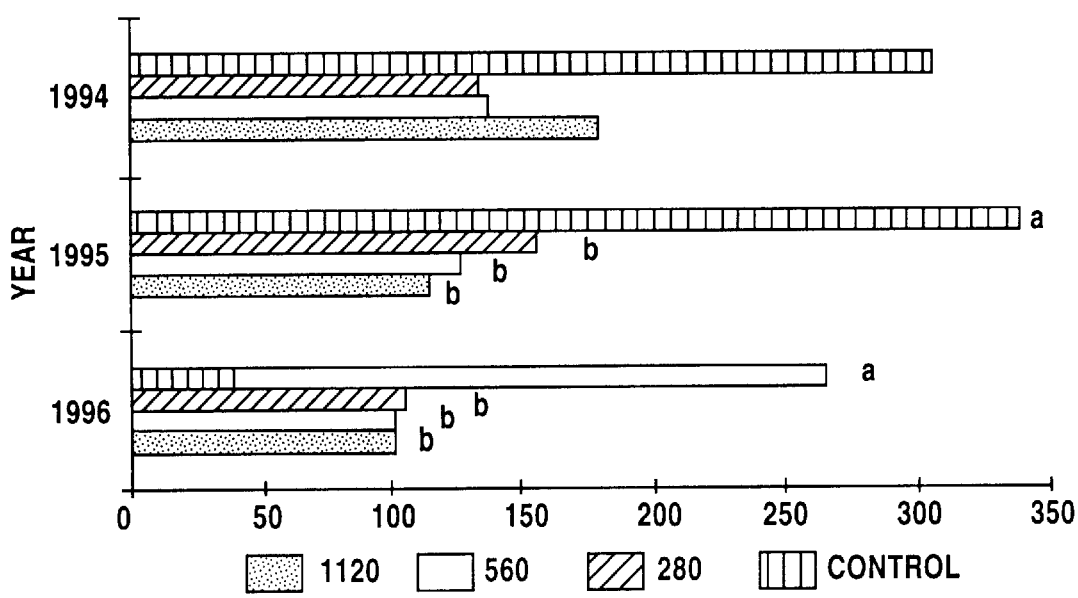
Figure 11A:
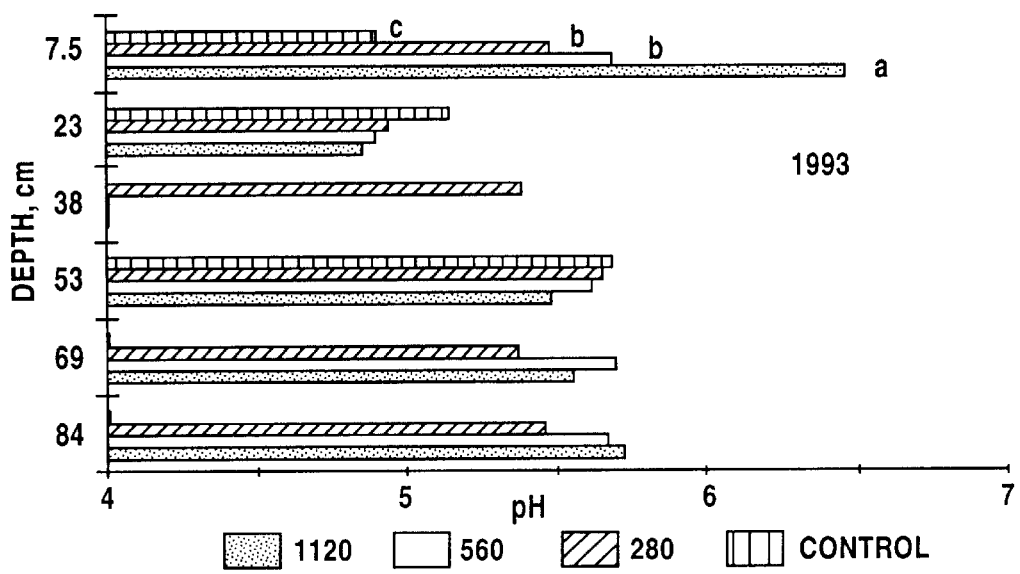
Figure 11B:
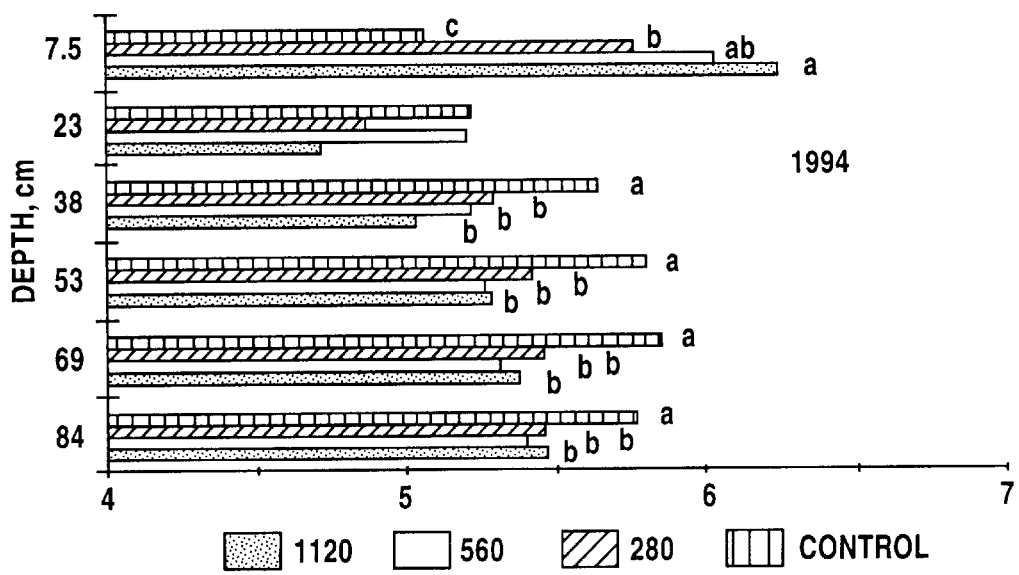
Figure 12A:
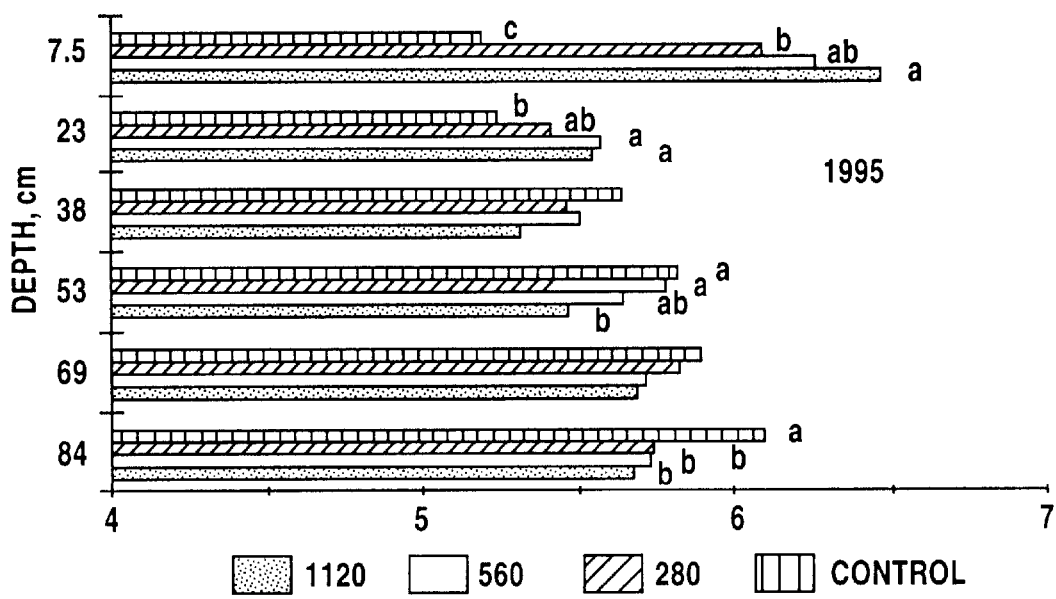
Figure 12B:
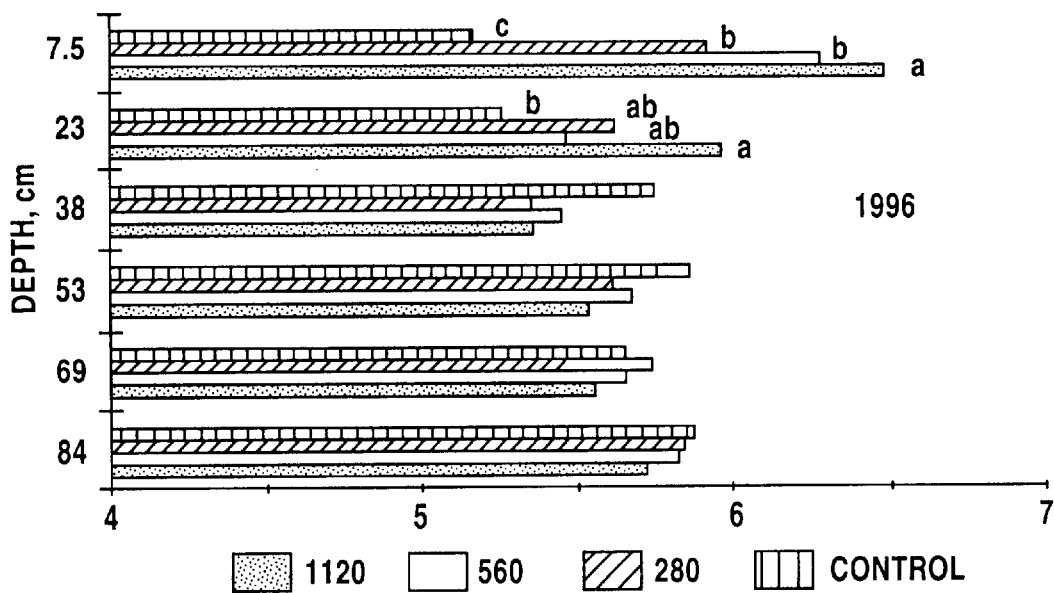
Figure 13A:
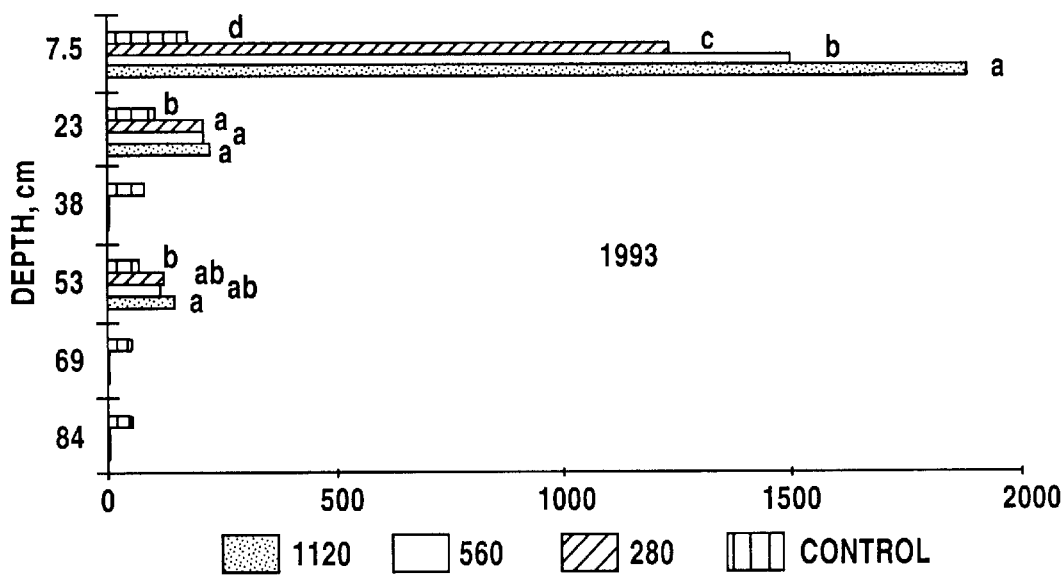
Figure 13B:
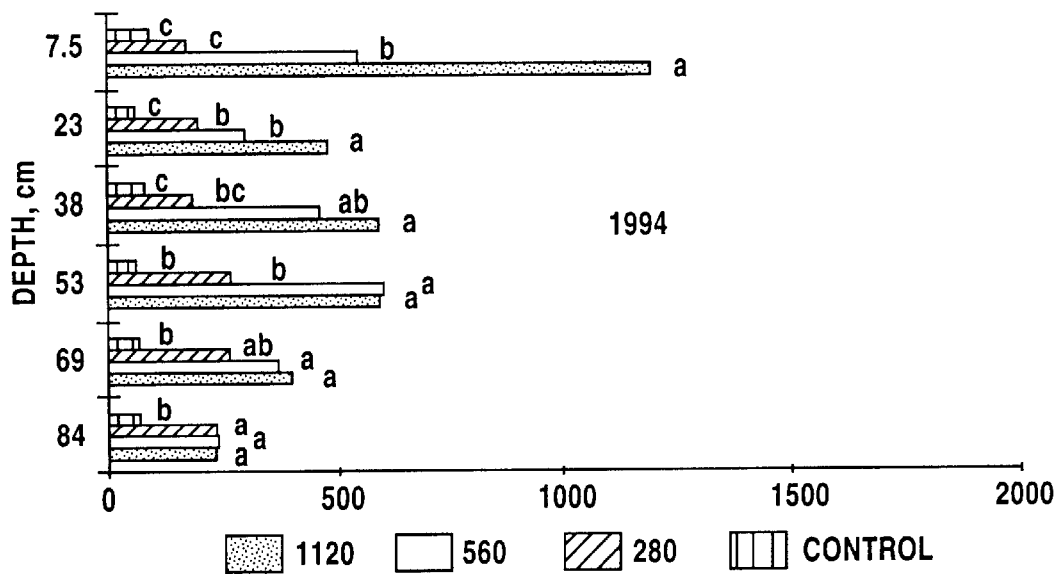
Figure 14A:
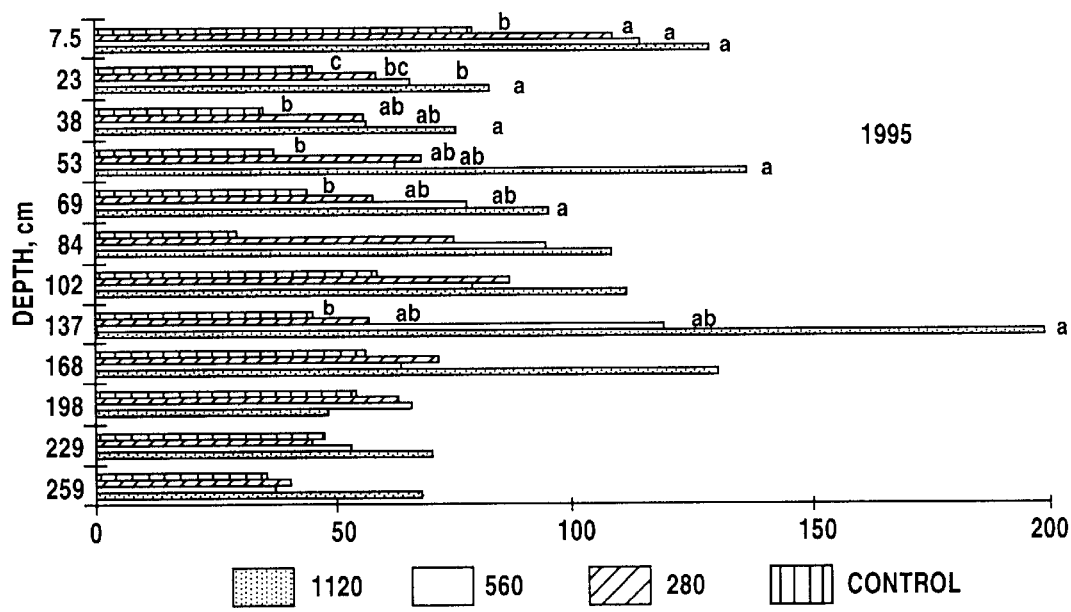
Figure 14B:
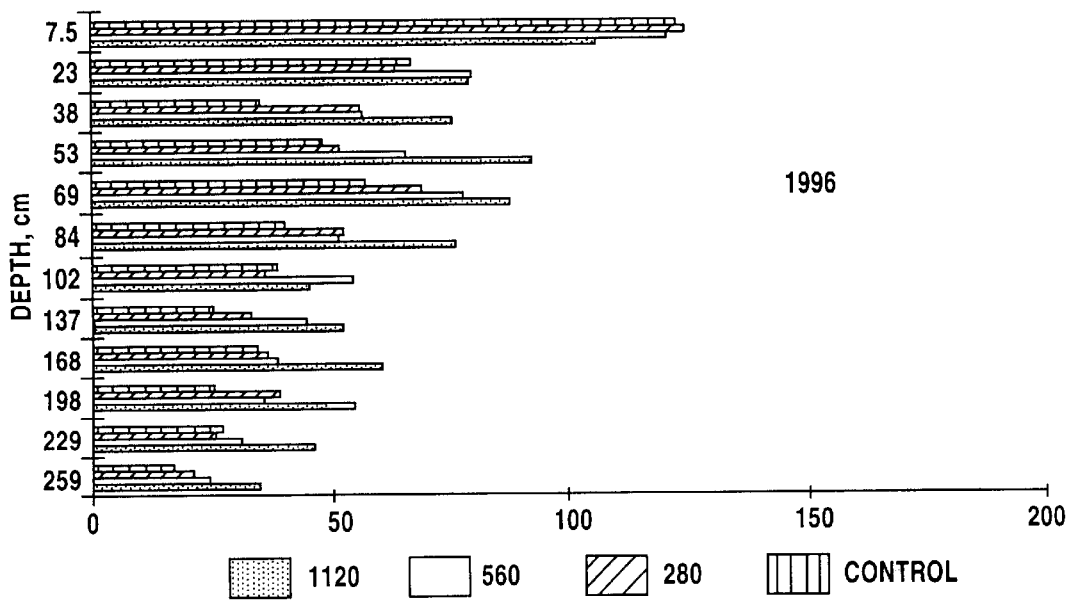

FIGS. 8A and 8B respectively are graphs of plant tissue concentrations (ug kg$^{-1}$) of selenium and arsenic after the addition of fly-ash (Mg ha$^{-1}$);

FIGS. 9A and 9B respectively are graphs of plant tissue concentration (mg kg$^{-1}$) of zinc and molybdenum after the addition of fly-ash (Mg ha$^{-1}$);

FIGS. 10A and 10B respectively are graphs of plant tissue concentrations (mg kg$^{-1}$) of boron and manganese after the addition of fly-ash;

FIGS. 11A and 11B respectively are graphs of soil pH at various soil depths as affected by ash treatment (Mg ha$^{-1}$) over time (1993–1994);

FIGS. 12A and 12B respectively are graphs of soil pH at various soil depths as affected by ash treatment (Mg ha$^{-1}$) over time (1995–1996);

FIGS. 13A and 13B respectively are graphs of electrical conductivity at various soil depths as affected by ash treatment rate (Mg ha$^{-1}$) over time (1993–1994); and FIGS. 14A and 14B respectively are graphs of electrical conductivity at various soil depths as affected by ash treatment rate (Mg ha$^{-1}$) over time (1995–1996).

DETAILED DESCRIPTION OF THE PREFERRED EMBODIMENTS

The present invention utilizes coal fly ash in the cultivation, growth, maintenance and harvest of turfgrasses. The present invention provides improved sod harvestability wherein moisture in harvested turfgrass remains longer to thereby improve the shelf stability of the sod. The present invention further provides improvements in the water balance of soil, whereby facilitating better soil drainage which translates to better traction for athletes in soggy conditions, and better drainage, which makes the invention ideal for use in athletic fields, golf courses, and the like. These and other advantages of the invention will become more apparent from the following detailed description of the preferred embodiments.

The present invention provides an improved soil for use in the cultivation, growth, maintenance and production of turfgrasses. More specifically, the present invention treats existing soils with coal fly ash at relatively high rates. Thus, the present invention not only provides a manner to use coal fly ash in abundant amounts, but also advantageously improves soil for turfgrasses.

Advantageously, the coal fly ash used in the present invention is applied to soils requiring improvement in water retention and drainage characteristics. Sandy soils or clay soils can particularly benefit from the present invention. Clay is composed of soil particles that are less than 2 micrometers in size; more than 30% of clay in a bulk field soil would be considered clayey or heavy soil, whereas less than 5% to 10% of clay would be considered sandy or light soil. Preferable, the soil to be improved is a soil which is prone to drought, such as soils that have less than 5% to 10% of clay (by weight), especially when low in organic matter content.

In a preferred embodiment, coal fly ash is applied to an existing soil at a rate of at least 280 Mg ha$^{-1}$ (corresponding to a thickness of about 1 inch (2.5 cm)). In a preferred embodiment of the invention, the upper limit of coal fly ash is set to about 1,120 Mg ha$^{-1}$ (a thickness of about 4 inches (10 cm)) wherein a particularly preferred application rate ranges from about 280 to 560 Mg ha$^{-1}$ (a thickness of about 1 to 2 inches).

Since coal fly ashes can have a wide range of pH and salinity, including boron content, depending on the source of the parent coal, care should be taken in the selection of the fly ash due to the sensitivity of turfgrasses to these constituents. Fly ashes selected from the eastern US coal would favor a shorter weathering exposure compared with ashes originating from the western US, because of the characteristically alkaline and saline nature of the latter. However, the salinity and boron contents of western fly ashes are just as easily leachable as eastern fly ashes.

Only fly ashes from the electrostatic precipitator or baghouses should be used in this practice to maintain the silty nature of these materials, which enhances the water relations of either sandy or clayey soil through better drainage and aeration, and higher water retention in the latter and former soils, respectively. Course bottom ashes should be avoided as this will negate these advantages.

The coal fly ash utilized in the present invention is weathered. Unweathered coal fly ash can be utilized if it is allowed to weather after being applied to the existing soil.

By the term "weathered", it is meant a condition which allows leachable elements present in the fresh coal fly ash to substantially leach therefrom to an extent which reduces the adverse effect of such elements on the growth of turfgrass. When fresh coal fly ash is applied to the existing soil, it should be allowed to weather at least 4 to 5 months under southeastern US conditions to allow 15 to 20 inches of rainfall or irrigation water for leaching, preferably 5 to 6 months prior to cultivating a turfgrass.

The treated soil can also be tested for the presence of the leachable elements. When it is determined that the amount of leachable elements has been reduced sufficiently, then a turfgrass can be cultivated. It is preferred that the amount of boron or level of salinity are below about 1 to 2 mg per kg ash, and below about 1,500 microSiemens per cm, respectively.

The existing soil which is to be improved with the application of coal fly ash in the present invention may have a pH of from 4 to 8, more preferably from 5.5 to 7.5. The application of the weathered coal fly ash used in the present invention may elevate the pH of relatively acidic soils, but not to an extent which would adversely affect the growth of the turfgrass.

The coal ash utilized in the present invention can have a pH ranging from 6 to 12, and preferably has a pH of 6.5 to 8.5.

After applying the coal fly ash to the existing soil, the soil is worked or tilled to a depth of at least 8 to 18 inches, and more preferable to a depth of 8 to 10 inches. Any suitable means for working the coal ash into the soil to the prescribed depth can be employed, such as rototilling, disking, and the like.

When the mixed soil has reached a state suitable for planting, i.e., after a period of weathering if fresh coal fly ash is utilized, a turfgrass is cultivated. For example, the treated soil can be seeded by a suitable turfgrass. Suitable turfgrasses include, but are not limited to, tall fescues, fine fescues, perennial ryes, Kentucky bluegrass, rough bluegrass, creeping fescues, Zoysia, Bermudagrass, centipedegrass, St. Augustinegrass, carpetgrass, Bahiagrass, and Buffalograss. Generally, turfgrasses require a pH range of from about 4.5 to 8.0. Turfgrasses at the low end of this pH range include centipedegrass (4.5–5.5), and carpetgrass (5.0–6.0). Examples of suitable soil pH ranges for other turfgrasses are: Kentucky bluegrass (5.5–6.5), rough bluegrass (6.0–7.0), perenial rye (6.0–7.0), creeping red fescue (5.5–6.5), chewings fine fescue (5.5–6.5), tall fescue (5.7–7.0), Zoysia (6.0–7.0), Bermnudagrass (6.0–7.0), St. Augustinegrass (6.5–7.5), Bahiagrass (6.5–7.5) and Buffalograss (6.0– 8.0). Of course, the turfgrass can also be established by use of grass plugs or use of sod. The use of sod can be employed advantageously in athletic fields, golf courses, residential lawns, and the like.

It has been discovered that the use of coal fly ash is accordance with the present invention provides many advantages when employed in a turf farm. The treated soil provides improvement not only during the growth of the turfgrass, but also during the harvest and shipment of sod therefrom. In particular, the blading characteristics during harvest are improved on the treated soil as compared with the untreated soil. Such improved blading facilitates the harvesting of the sod. In addition, since the treated soil has better moisture retention than untreated soil, the harvested sod is improved in its shelf-life. It was also discovered that the soil held together better in the harvested sod.

An evaluation was conducted of actual benefits and potential detrimental impacts of applying relatively high rates of unweathered precipitator fly-ash at a turf farm over a 4-year period. Because certain constituents in the ashed soil could leach, dissipate, or increase in their bioavailability to the grass plant with time, plant establishment and yield, soil nutrient and elemental status, soil salinity, and groundwater chemistry were measured temporally over the entire study period. The results are summarized as follows:

Among the soil physical properties evaluated, the water holding capacity and plant available water were the most significantly enhanced.

Phytotoxic constituents from unweathered fly-ash, including soluble salts and boron, inhibited initial plant establishment, but upon weathering and leaching allowed normal plant growth.

Ash application significantly increased the contents in plant tissue of B, Mo, As, Be, Se, Ba, and Na, and significantly reduced Mg, Mn, and Zn contents.

Ash treatment did not produce any alkaline soil reaction, rather most pH increases were between pH 5.5 and 6.5, considered optimum for turf species.

Soil salinity increased with application rate, with the highest salinity occurring in the initial year but completely disappearing from the soil profile after 3 years.

No nutrient imbalance was observed by ash treatment, except possibly between Ca and Mg in the plant but no visual Mg deficiency symptoms were observed.

Except for As, none of the cumulative lifetime loading rates mandated by South Carolina Department of Health and Environmental Control, Chapter 61 (SCDHEC, 1996) were exceeded. The As excess should not be consequential since the As content of plant tissue collected was more than an order of magnitude below the maximum tolerable levels of dietary minerals for domestic animals (National Research Council, 1980).

Trace metal concentrations in the underlying groundwater were not affected by ash addition. A more detailed discussion of the experiments follows. The long-term (1993–96) field study assessed the effects of applying high rates of coal fly-ash as a soil amendment for the growth of the turf species, centipedegrass (*Eremochloa ophiroides*).

A Latin Square plot design was employed with a control (no ash applied), and 280, 560, and 1,120 Mg ha$^{-1}$ (i.e., tonne/ha) application rates of unweathered baghouse fly-ash from a power station of the South Carolina Electric and Gas Company. The applied fly-ash was spread evenly over each plot area, rototilled, and allowed to weather for 8 months before seeding to centipedegrass.

High levels of soluble salts, indicated by the electrical conductivity of the soil extracts, in tandem with the phytotoxic effect of B, apparently inhibited the initial plant establishment as shown by substantially lower germination counts in ashed soils. The plant height and root length, however, were not adversely affected, nor were the dry matter yields throughout the study period. Ash treatment did not significantly influence infiltration rate, bulk density, or temperature of the soil, but substantially improved its water holding capacity and plant available water. This enhanced water retention capacity apparently rendered the soil less droughty and improved the coherence and handling property of the harvested sod.

Ash application significantly increased the concentrations in plant tissue of B, Mo, As, Be, Se, Ba, and Na, while also significantly reducing the concentrations of Mg, Mn, and Zn. The other elements in the study, i.e., K, Ca, Cu, Fe, Ag, Cd, Cr, Hg, Ni, Pb, Sb, Tl, and Al, were not affected. Of these elements, Mg, Cu, and Mo concentrations in plant tissue increased with time, i.e., from 1994–96, while B and Se decreased temporally. The diminution of B and Na appear to be related to the leaching of soluble salts from ashed soils.

Ash treatment elevated the soil pH to as high as 6.45 with the 1,120 Mg ha$^{-1}$ rate, with the enhanced effect occurring primarily in the 0–15 cm depth. Soil salinity increased with the application rate, the highest occurring at the 1,120 Mg ha$^{-1}$ rate, and with the largest increases occurring in the initial year of application, i.e., 1993. In 1994, most of the soluble salts had already leached from the treatment zone into deeper depths, and by 1996, these salts had completely leached out of the profile.

Contrary to prediction, increases in the soil extractable form (method used to predict soil fertility recommendations) of P, K, Ca, Mg, Cu, Fe, Zn, Ag, Be, B, Cd, Cr, Ni, and Sb did not significantly correlate with their plant tissue concentrations; however, Al, Be, Ca, and Mo extractable forms strongly, but not significantly, parallel their tissue contents. The exception being Mn where significant correlation ($p=0.0001$) existed between the soil and plant concentrations.

The chemical composition of the underlying groundwater was not adversely affected by the ash application, including metals listed in the South Carolina Department of Health and Environmental Control groundwater quality criteria (i.e., As, Cd, Cu, Pb, Hg, Ni, Se, and Zn). With the exception of As, none of the metals listed under the SCDHEC, Chapter 61 Rules (i.e., As, Cd, Cu, Pb, Hg, Ni, Se, and Zn), even at the highest fly-ash application rate (i.e., 1,120 Mg ha$^{-1}$) exceeded the Agency's lifetime cumulative loading rates.

The cumulative lifetime loading limit for As is listed at 41 kg/ha, exceeded by 560 Mg/ha rate (i.e., 70 kg/ha) and by the 1,120 Mg/ha rate (i.e., 140 kg/ha). These higher rates, however, did not result in adverse effect on the quality of plant tissue and groundwater. The 4.5 kg/ha limit for B, a soluble salt, was exceeded by all the ash rates (i.e., 5.9, 11.8, and 23.6 kg/ha hot water soluble B, respectively for 280, 560, and 1120 Mg/ha rates). These high B values reflected the unweathered nature of the ash used, which was allowed to weather to allow leaching of soluble salts under field condition before planting.

The rates used in this long-term experiment exceeded SCDHEC application limit of 22.4 Mg/ha/yr (10 ton a$^{-1}$, yr$^{-1}$) for Class I solid waste on cultivated croplands or forest lands. Plant tissue and groundwater data, however, indicate that much higher rates can be used on this kind of land use (i.e., turf farm) where the plant species, centipedegrass, is tolerant of soluble salts and does not bioaccumulate potentially toxic trace elements.

Experimental Parameters

Figure 1:
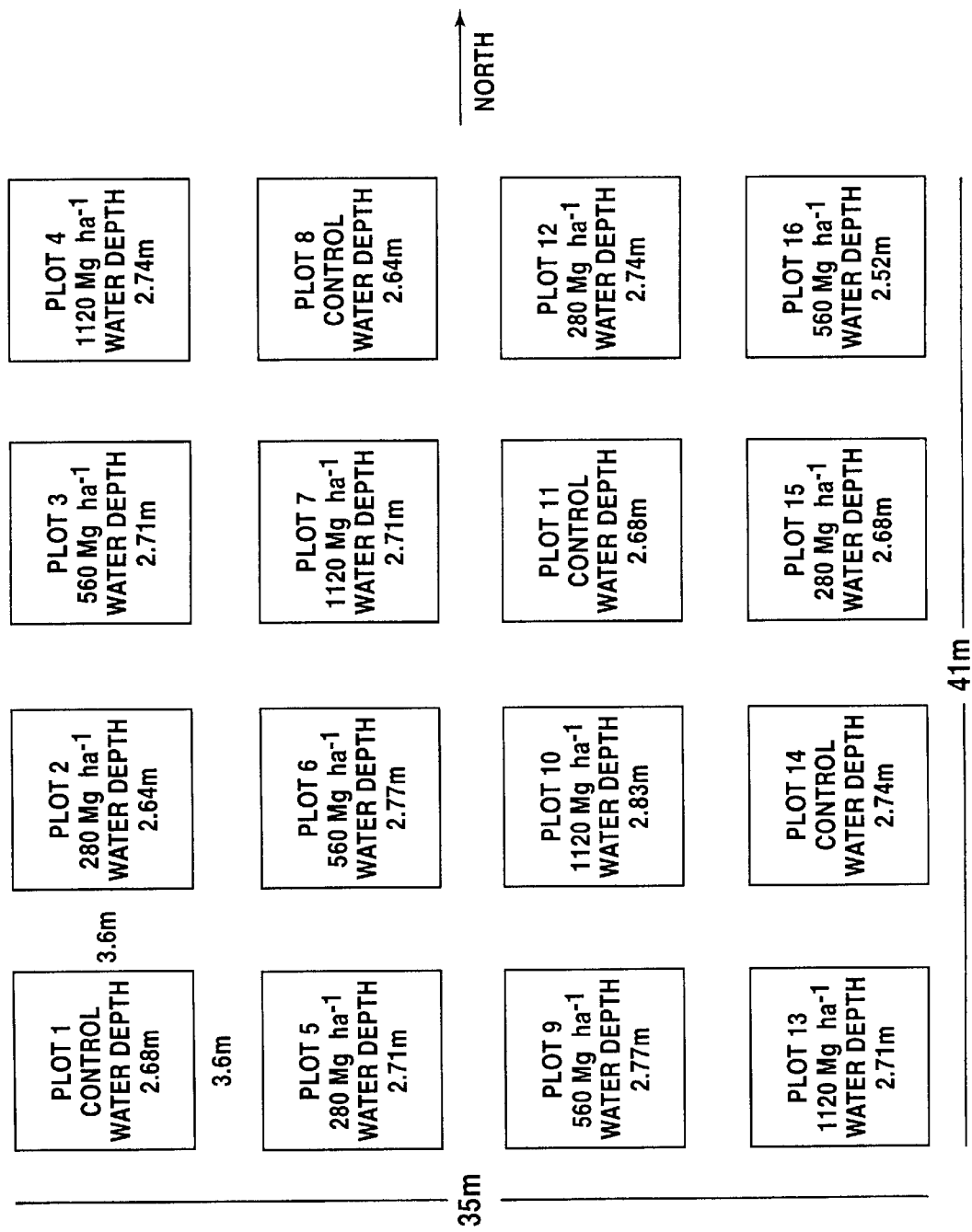
FIG. 1 illustrates the Latin Square employed in the experimental study of the invention.

The field study was begun by establishing a Latin Square design of four treatments (control (0), 280, 560, and 1,120 Mg ha$^{-1}$ of coal fly-ash). The research area was 1,465.6 m$^2$ (FIG. 1). Each treatment plot (subplot) was 46.5 m$^2$, (6.08 m×7.6 m) with 3.6 m between each subplot. Fly-ash was piled and spread to the desired thickness for each subplot and then tilled with a Howard rotovator. Samples of fly-ash were taken from each sub-plot before tilling. The entire plot was seeded with centipedegrass (*Eremochloa ophiroides*) at a rate of 11.2 kg ha$^{-1}$ and rolled for better seed and soil contact. After the initial planting, the 1,120 Mg ha$^{-1}$ treatment, experienced very little germination, probably due to insufficient mixing of the ash and underlying soil. This most likely resulted from the ash desiccating over the 3 day process of establishing the subplots, creating a powdery ash which could not be tilled adequately. Consequently, the plots were retilled, reseeded at the previous rate, and rolled. After each spring's "greening up", 24 kg ha$^{-1}$ of N as 34-0-0 (i.e., 34% N-0% $P_2O_5$-0% $K_2O$) were applied on the plots every 6 weeks, three times annually, during spring and early summer months. No phosphorus (P) or potassium (K) was applied.

The fly-ash utilized in this experiment was from the Urquhart Power Station of the South Carolina Electric and Gas Company in Beech Island, S.C. This is a pulverized coal fired unit burning eastern Appalachian bituminous coal (Type F). The fly-ash was conditioned and collected using electrostatic precipitators and stored in a silo. The fly-ash that was delivered to the research area was taken directly from the silo. The soil within the research plot is classified as a Congaree silt loam of the Shellbluff series. It is a fine-silty, mixed, thermic Fluventic Dystrochrepts, characterized by silty clay loam within the 0–1.8 m depth. The plot area has less than 1% slope, well drained, and moderately permeable.

A shallow groundwater well was placed within each of the sixteen subplots. The depths of the wells usually were around 3.6 m, with a maximum of 4.4 m. These 1.9 cm PVC wells were established utilizing water pressure from a hi-pressure washer. The average depth to groundwater was 2.7 m. The screen area was backfilled with sand and the wells were developed after all the wells were in place.

Soil samples were taken throughout the duration of this experiment using a number of soil sampling techniques, including 1.9 cm diameter soil probe for shallow samples and a drill rig for deeper samples. In the first three samplings, 1.22 m depth cores were obtained while the last two samplings were taken to a depth of 2.74 m. After samples were collected they all received a similar treatment, including air drying before being passed through a 2 mm sieve. For certain parameters (e.g., bulk density) samples were also weighed. Analysis of pH and electrical conductivity (E.C.) were calculated on a 1:1 (w/w) ratio of soil to deionized water. The samples were also extracted using the Mehlich I double acid extraction procedure (AOAC, 1995). The filtered extractant was analyzed on a ICP (Inductively-coupled plasma spectrometer) to determine a suite of elements.

Well water samples were collected by first pumping at least four well volumes of water with a peristaltic pump utilizing nalgene and silicon tubing. Before collecting a well water sample the tubing was changed. Temperature, E.C., and pH were obtained in the field using a Hanna HI 9033 multi-range conductivity meter and a Fisher Scientific accumet 1003 pH/ISE/mV meter with temperature probe. The conductivity meter was calibrated in the laboratory while the pH meter was calibrated onsite. Immediately after the readings for pH and E.C. had stabilized, the samples were logged and packed in an ice chest at a temperature less than or equal to 4° C. In the laboratory, the water samples were filtered through a 0.45 $\mu$m filter and acidified with concentrated nitric acid to a pH less than 2.0. All metals except As, Se, and Hg were analyzed on a ICP. Arsenic and Se were analyzed using a hydride system and an GFAAS (Graphite furnace atomic absorption spectrometer). Mercury was analyzed using a cold vapor technique and atomic fluorescence (A.A.S.). Groundwater samplings were taken on nine different dates.

Plant biomass production was measured by harvesting the whole subplot approximately 2 cm from the ground and weighing the tissue in the field. This collection procedure was done six times. A subsample of the weighed tissue was collected for mineral and nutrient analysis as well as for calculating dry weight yields. Tissue used for nutrient and trace element analyses was washed (rinsed) with deionized water. Both the reweighed subsamples and the washed samples were placed in a drying oven, maintained at 65° C., to obtain a constant weight. The subsamples were weighed once more to calculate dry weights. The washed dried samples were ground using a Arthur Thomas "Wiley mill"

and a laboratory mill that passed through a 2 mm mesh screen. Elemental analysis was conducted on dried and ground plant tissue. Nitrogen was determined using a Kjeldahl procedure. Both wet and dry digestion were performed on the plant tissue in accordance to the $16^{th}$ edition of AOAC methods 975.03 and 968.08 (AOAC, 1995). As with water samples, analysis for As and Se was performed on the digested plant tissue using the hydride system and the GFAAS; mercury using the cold vapor atomic fluorescence technique (A.A.S.); and other elements using the ICP.

Field capacity values were obtained by saturating the plot and allowing it to drain freely for 48 hours. Shallow soil samples (0–15 cm) were taken from each subplot, sealed in a zip lock bag, and weighed. These samples were air dried and weighed. The percentage of moisture within the micro pores was calculated by subtracting the dry weight from the wet weight and then dividing it by the dry weight, multiplied by 100.

Bulk density was calculated using a soil sampler of known volume to collect an intact soil core, which was then oven dried and weighed. The bulk density was determined by dividing the dry weight by the volume.

Plant available water (PAW) values were assessed by placing an intact saturated soil core on a porous plate. A series of pressures (vacuum) were applied to the porous plate and allowed to stabilize for one week at each pressure. Plant available water (PAW) is defined as the amount of water that a soil mass can release between field capacity (0.33 bars) and permanent wilting point (15 bars). PAW can be obtained by weighing the soil mass at each pressure and calculating the volume of each mass. An infiltration ring (1.2 m dia.) was employed for determining the steady state infiltration rate. Fly-ash texture analysis was conducted using the hydrometer method. Rain and irrigation water was measured and recorded using a Belfort weighing bucket, strip chart recorder, and rain gauge.

Statistics were obtained by using PC SAS version 6.12 for Windows TS020, copyright 1995 by SAS Institute, Inc. and distributed by UCNS-MSD, UGA 1997. Many groundwater observation were below the detection limit, so the non-parametric Kruskal-Wallis test was used to test equality of treatment groups. This test compares ranks of observations, which can be done easily with values like $\leq 0.05$ ppm, rather than means. For other variables, one-way ANOVA and Tukey's means separations were used. Tukey's procedure was used because it has reasonable power while controlling the experiment-wise Type I error rate (SAS, 1990).

Also reported are standard deviations (s.d.'s) and pooled s.d.'s. These values (positive square root of the variance) are listed to show the amount of dispersion or scatter. The pooled s.d.'s are reached by using the s.d.'s for each treatment. Depending on factors such as sample size (n), Tukey's significance differences may require the pooled s.d.'s be multiplied. The total and extractable elemental contents of the fly-ash are presented in Table 1. The extractable fraction represents that portion of the total content that is relatively available for root uptake. In this regard, it will be termed the bioavailable fraction. The fly-ash can be classified as a Class F fly-ash, since the coal being used by this power station usually came from eastern Kentucky and Virginia, which are not known to produce "high lime" fly-ashes.

Experimental Results

The fly-ash used had a pH of 7.98–8.20 and electrical conductivity of 1,830–3,350 $\mu S$ $cm^{-1}$ (Table1). Most of the values for elemental constituents fall within the range reported for fly-ash generated for eastern U.S. coal (U.S. EPA, 1988). The rather high extractable fractions for K, Ca, Mg, B, and Na implies that sizable portions of these elements are bioavailable for root uptake or available for leaching. These constituents are usually a concern in producing phytotoxicity and/or elevating the electrical conductivity of the soil solution. Boron, an essential plant micronutrient, is of special concern because it could be phytotoxic without excessively elevating the soil electrical conductivity. The loading rates for the various elements from fly-ash application are indicated in Table 2.

TABLE 1 pH - 7.98–8.20 E.C. $\mu S$ $cm^{-1}$ - 1830–3350* Particle density = 2.16 g $cm^{-3}$
O.M. - 8.6–9.4%, $CaCO_3$ equivalent < 1.0% Carbon 10.2–10.5
Total S - 0.126–0.130%

| Element | Total | Extractable |
|---|---|---|
| A: Macro nutrients (P and K) | | |
| Phosphorus | 1388–1432 | 191–202 |
| Potassium | 2.08–2.19% | 480–532 |
| B: Secondary nutrients (Ca and Mg) | | |
| Calcium | 1.3–1.4% | 3800–4404 |
| Magnesium | 5179–5426 | 187–248 |
| C: Micro nutrients (B, Cu, Fe, Mn, Zn, and Mo) | | |
| Boron (Total = hot water) | 19.9–21.1 | 21–25 |
| Copper | 184–263 | 15.2–19 |
| Iron | 4.1–7.3% | 21–199 |
| Manganese | 282–305 | 11–14 |
| Zinc | 77–106 | 5.2–5.6 |
| Molybdenum | 15–16.2 | 0.28–1.8 |
| D: Trace elements (Ag, Be, Cd, Cr, Ni, Pb, Sb, and Tl) | | |
| Silver | 0.68–0.78 | 0.12–0.24 |
| Beryllium | 18–19.2 | 0.79–0.92 |
| Cadmium | 3.0–5.0 | 0.23–0.32 |
| Chromium | 97–155 | 3.2–4.7 |
| Nickel | 79–111 | 1.92–2.3 |
| Lead | 247–263 | <0.12–1.3 |
| Antimony | <5.0 | <0.2 |
| Thallium | 4.9–5.7 | 0.36–0.56 |
| E: Miscellaneous elements (Al, Ba, Na, Si, Sr, Co, As, Se, and Hg) | | |
| Aluminum | 7.5–11.7% | 696–1152 |
| Barium | 53.7–76.5 | 0.52–0.64 |
| Sodium | 4183–4420 | 356–364 |
| Silicon | 18–19% | — |
| Strontium | 162–183 | — |
| Cobalt | 42–53 | — |
| Arsenic | 112–125 | 70–75.2 |
| Selenium | 8.4–11 | 1.23–1.54 |
| Mercury | 0.22–0.31 | — |

* For conversion: 1 $\mu S$ $cm^{-1}$ = 1 $\mu mho$ $cm^{-1}$

TABLE 2

| | | Mg $ha^{-1}$ | |
|---|---|---|---|
| Element (kg $ha^{-1}$) | Control | 280 | 560 | 1120 |
| Phosphorus | none | 401 | 802 | 1604 |
| Potassium | none | 6132 | 12264 | 24528 |
| Calcium | none | 3920 | 7840 | 15680 |
| Magnesium | none | 1519 | 3038 | 6076 |
| Boron (extractable hot water) | none | 5.9 | 11.8 | 23.6 |
| Copper | none | 74 | 147 | 295 |
| Iron | none | 20440 | 40880 | 81760 |
| Manganese | none | 85 | 170 | 340 |
| Zinc | none | 30 | 60 | 120 |
| Molybdenum | none | 4.5 | 9 | 18 |
| Silver | none | 0.22 | 0.44 | 0.88 |
| Beryllium | none | 5.4 | 10.8 | 21.6 |
| Cadmium | none | 1.4 | 2.8 | 5.6 |
| Chromium | none | 43 | 86 | 172 |
| Nickel | none | 31 | 62 | 124 |
| Lead | none | 74 | 147 | 295 |
| Antimony | none | <1.4 | <2.8 | <5.6 |
| Thallium | none | 1.6 | 3.2 | 6.4 |

TABLE 2-continued

| Element (kg ha$^{-1}$) | Control | Mg ha$^{-1}$ | | |
| --- | --- | --- | --- | --- |
| | | 280 | 560 | 1120 |
| Aluminum | none | 32760 | 65520 | 131040 |
| Barium | none | 21 | 43 | 86 |
| Sodium | none | 1238 | 2476 | 4952 |
| Silicon | none | 53200 | 106400 | 212800 |
| Strontium | none | 51 | 102 | 205 |
| Cobalt | none | 15 | 30 | 59 |
| Sulfur | none | 364 | 728 | 1456 |
| Arsenic | none | 35 | 70 | 140 |
| Selenium | none | 3.1 | 6.2 | 12.4 |
| Mercury | none | 0.087 | 0.174 | 0.348 |

Figure 2A:
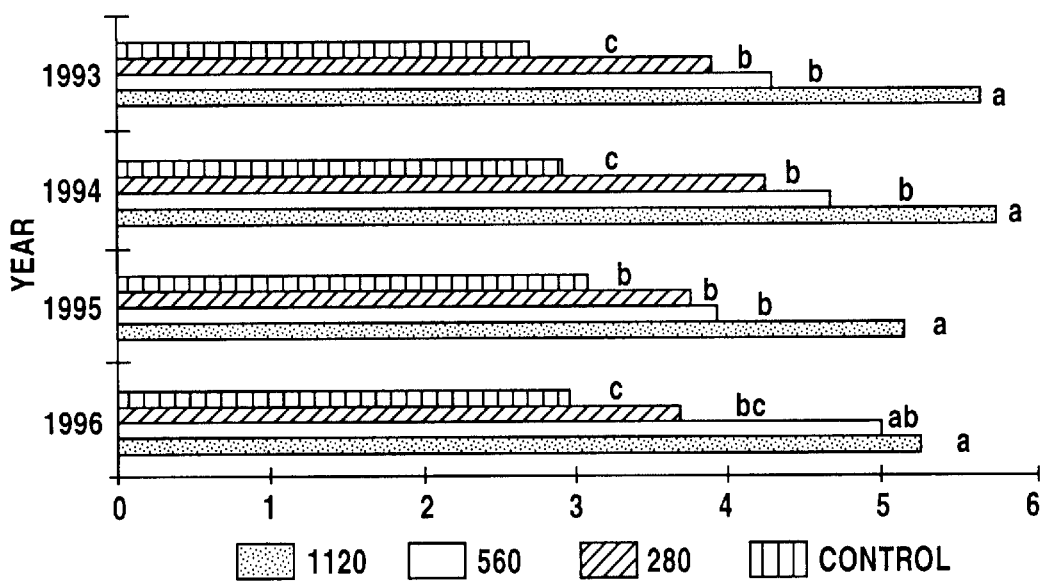
FIGS. 2A and 2B are graphs of % LOI for soil after the addition of ash at various rates (Mg ha$^{-1}$)
Figure 2B:
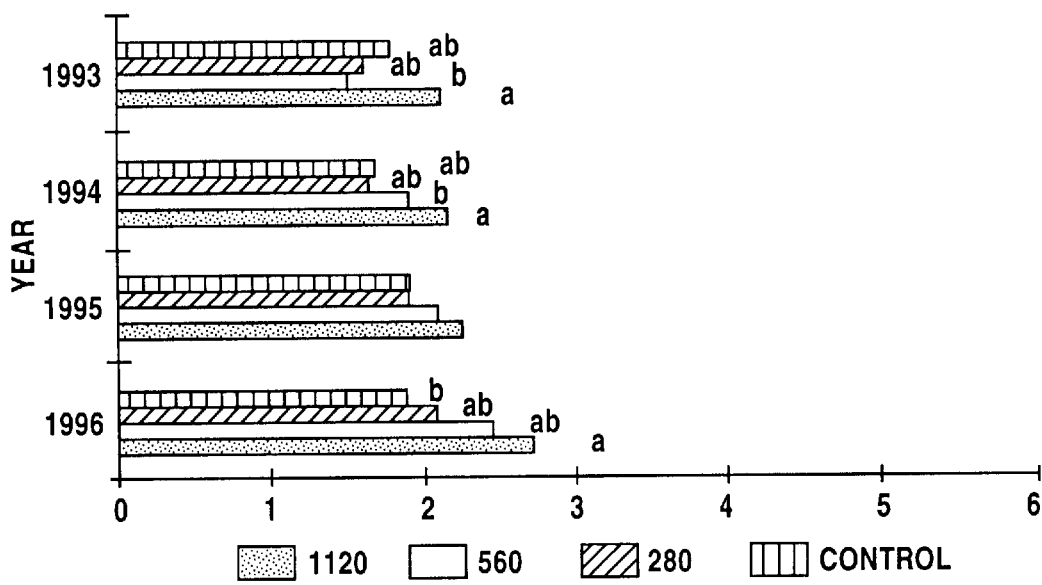

FIG. 2A shows the % LOI (percent) carbon lost on ignititon (450° C.) for soil at 0–15 cm depth, and FIG. 2B shows the % LOI at 15–30 cm depth, after the addition of ash at various rates. Values within a year sharing the same letter or having no letter are not statistically different at $p<0.05$ by Turkey's Test.

The unburned organic carbon in the fly-ash is reflected in the data for soil organic matter listed in Table 3, item A, below. The significant increasing amounts of soil organic matter from the control to the 1,120 Mg ha$^{-1}$ rate, respectively, are apparently due to the unburned coal and not due to organic matter buildup from the decay of the centipede plant debris (Table 3, item A).

TABLE 3

A: Soil organic matter (SOM), in percent (LOI)

| Year | cm | n | Control | (s.d.) | 280 | (s.d.) | 560 | (s.d) | 1120 | (s.d.) | pool s.d. |
| --- | --- | --- | --- | --- | --- | --- | --- | --- | --- | --- | --- |
| 1993 | 7.5 | 20 | 2.68c | (0.37) | 3.89b | (0.38) | 4.28b | (0.56) | 5.63a | (1.09) | (0.67) |
| 1994 | 7.5 | 4 | 2.91c | (0.40) | 4.24b | (0.11) | 4.64b | (0.70) | 5.71a | (0.41) | (0.46) |
| 1995 | 7.5 | 4 | 3.08b | (0.26) | 3.74b | (0.15) | 3.90b | (0.72) | 5.13a | (0.41) | (0.44) |
| 1996 | 7.5 | 4 | 2.96c | (0.30) | 3.67bc | (0.97) | 4.98ab | (0.52) | 5.24a | (0.65) | (0.66) |
| 1993 | 23 | 20 | 1.77ab | (0.29) | 1.60ab | (0.17) | 1.48b | (0.41) | 2.10a | (0.56) | (0.38) |
| 1994 | 23 | 4 | 1.68ab | (0.17) | 1.61ab | (0.33) | 1.89b | (0.14) | 2.15a | (0.21) | (0.22) |
| 1995 | 23 | 5 | 1.90 | (0.22) | 1.88 | (0.17) | 2.07 | (0.60) | 2.24 | (0.34) | (0.37) |
| 1996 | 23 | 4 | 1.87b | (0.40) | 2.08ab | (0.28) | 2.46ab | (0.25) | 2.71a | (0.36) | (0.33) |
| All | 7.5 | 32 | 2.79d | (0.34) | 3.87c | (0.53) | 4.45b | (0.63) | 5.43a | (0.70) | (0.57) |
| All | 23 | 33 | 1.79b | (0.25) | 1.79b | (0.25) | 1.97b | (0.39) | 2.30a | (0.39) | (0.33) |

B: Soil bulk density, average (g cm$^3$)

| Control | (s.d.) | 280 | (s.d.) | 560 | (s.d.) | 1120 | (s.d.) | pool s.d. |
| --- | --- | --- | --- | --- | --- | --- | --- | --- |
| 1.38 | (0.06) | 1.34 | (0.04) | 1.34 | (0.07) | 1.31 | (0.05) | (0.06) |

C: Soil temperature (° C.) measured at different depths (5, 10, and 15 cm)

| Depth | n | Control | (s.d.) | 280 | (s.d.) | 560 | (s.d.) | 1120 | (s.d.) | pool s.d. |
| --- | --- | --- | --- | --- | --- | --- | --- | --- | --- | --- |
| 5 cm | 3 | 31.0 | (4.36) | 29.67 | (4.16) | 30.0 | (4.36) | 30.17 | (4.54) | (4.36) |
| 10 cm | 3 | 29.0 | (3.0) | 28.67 | (2.52) | 28.33 | (3.05) | 29.17 | (3.33) | (2.99) |
| 15 cm | 3 | 28.5 | (2.78) | 28.33 | (1.53) | 28.0 | (2.0) | 28.33 | (2.52) | (2.26) |

D: Soil water holding capacity (WHC), as percent water by weight

| n | Control | (s.d.) | 280 | (s.d.) | 560 | (s.d.) | 1120 | (s.d.) | pool s.d. |
| --- | --- | --- | --- | --- | --- | --- | --- | --- | --- |
| 4 | 16.98b | (2.2) | 19.67ab | (2.03) | 20.97a | (0.51) | 23.0a | (0.93) | (1.59) |

E: Plant available water (PAW), as percent water by weight, at each pressure (MPa) for a given volume of soil

| MPa | n | Control | (s.d.) | 280 | (s.d.) | 560 | (s.d.) | 1120 | (s.d.) | pool s.d. |
| --- | --- | --- | --- | --- | --- | --- | --- | --- | --- | --- |
| 0.005 | 5 | 15.2 | (2.4) | 19.3 | (1.2) | 23.5 | (1.8) | 27.0 | (5.6) | (3.23) |
| 0.01 | 5 | 16.7 | (0.5) | 25.1 | (4.1) | 25.9 | (1.2) | 32.1 | (8.0) | (4.54) |
| 0.033 | 5 | 12.7 | (2.0) | 16.3 | (1.1) | 19.7 | (1.8) | 22.7 | (4.9) | (2.35) |
| 0.075 | 5 | 10.9 | (1.5) | 13.0 | (0.8) | 16.0 | (1.5) | 16.7 | (2.5) | (1.69) |
| All | 20 | 14.1b | | 19.5ab | | 21.1ab | | 24.6a | | |

F: Soil steady state infiltration rate (cm sec$^{-1}$)

| n | Control | (s.d.) | 280 | (s.d.) | 560 | (s.d.) | 1120 | (s.d.) | pool s.d. |
| --- | --- | --- | --- | --- | --- | --- | --- | --- | --- |
| 4 | 0.0029 | (0.0014) | 0.0025 | (0.0011) | 0.0014 | (0.0007) | 0.0019 | (0.0007) | (0.001) |

Figure 3:
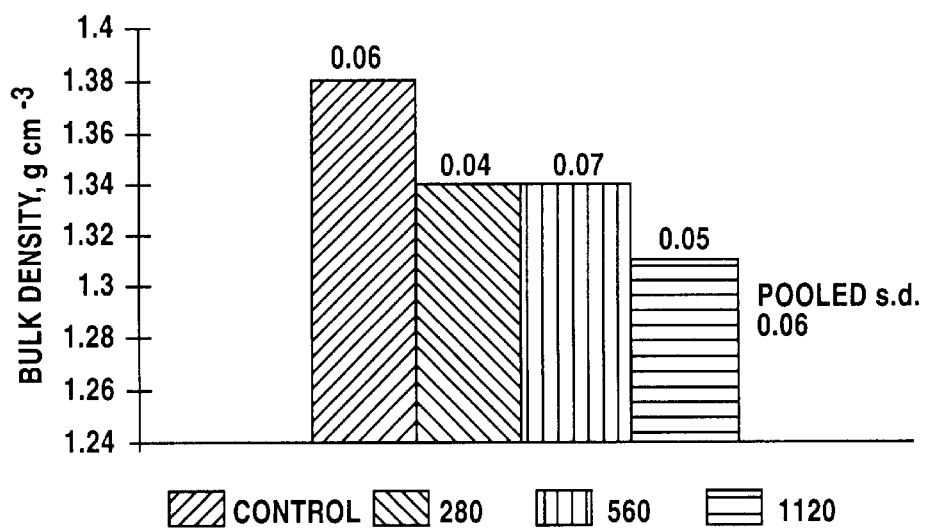
FIG. 3 is a graph illustrating bulk density of soil after the addition of fly-ash at various rates (Mg ha$^{-1}$)

There is no apparent effect of fly-ash application on the soil's bulk density (Table 3, item B). This can be explained by the fly-ash particle density of 2.16 g cm$^{-3}$, which is not much different from commonly assigned values of 2.6 g cm$^{-3}$ to 2.75 g cm$^{-3}$ particle density for typical agricultural soils. The observed bulk density of the soil ranged from 1.38 g cm$^{-3}$ for the control to 1.31 g cm$^{-3}$ for the 1,120 Mg ha$^{-1}$ treated soil. The bulk density of the soil after addition of fly-ash at various rates is shown in FIG. 3, wherein values above the bars are standard deviations (s.d.) with the overall s.d. listed as pooled s.d. No significant (statistical) differences were observed among the means for bulk density (Table 3, item B; and FIG. 3).

Apparently, the rate of fly-ash application did not induce any measurable increase in soil temperature in spite of visual darkening of the soil color (Table 3, item C). Dark-colored soils are expected to absorb more radiant energy than light-colored soil, as in the case of low organic matter-sandy soils.

Figure 4:
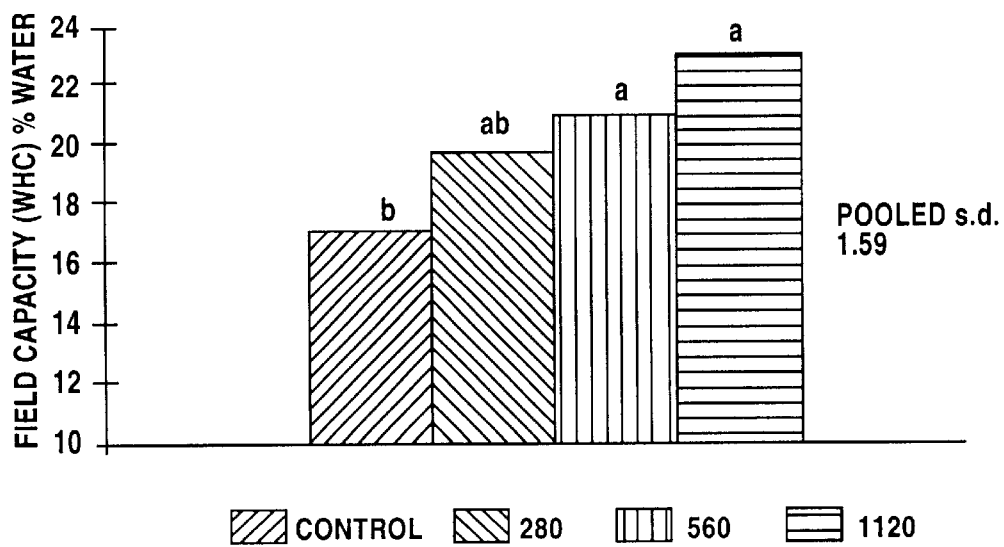
FIG. 4 is a graph of percent moisture of soil at field capacity (FC or WFC) after the addition of fly-ash (Mg ha$^{-1}$)

The primarily silt-size prevalence of the fly-ash used evidently enhanced the plant available water (PAW) and water holding capacity (WHC) of the soil, which is classified as a Congaree silt loam. The large surface area of spherical-shaped fly-ash particles is conducive to increasing the microporosity of the soil thereby enhancing the soil's air space, which is related to the soil's water holding capacity. In addition, some spheres are hollow (i.e., cenospheres) while others (plerospheres) are filled with smaller amorphous particles and crystals, further enhancing the microporosity of the treated soil. The increase in WHC appears to become significant starting with the 280 Mg ha$^{-1}$ rate as shown in Table 3, item D and FIG. 4. Likewise, the plant available water (PAW) becomes significant with the highest application of fly-ash (Table 3, item E).

Figure 5:
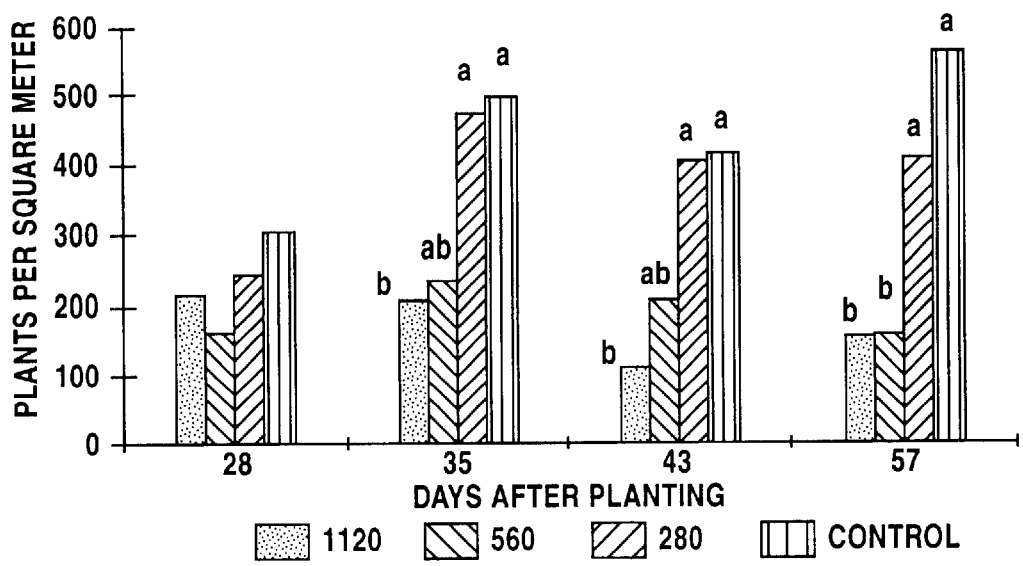
FIG. 5 is a graph of steady state infiltration rate (cm sec$^{-1}$) of soil after the addition of fly-ash (Mg ha$^{-1}$)
Figure 6:
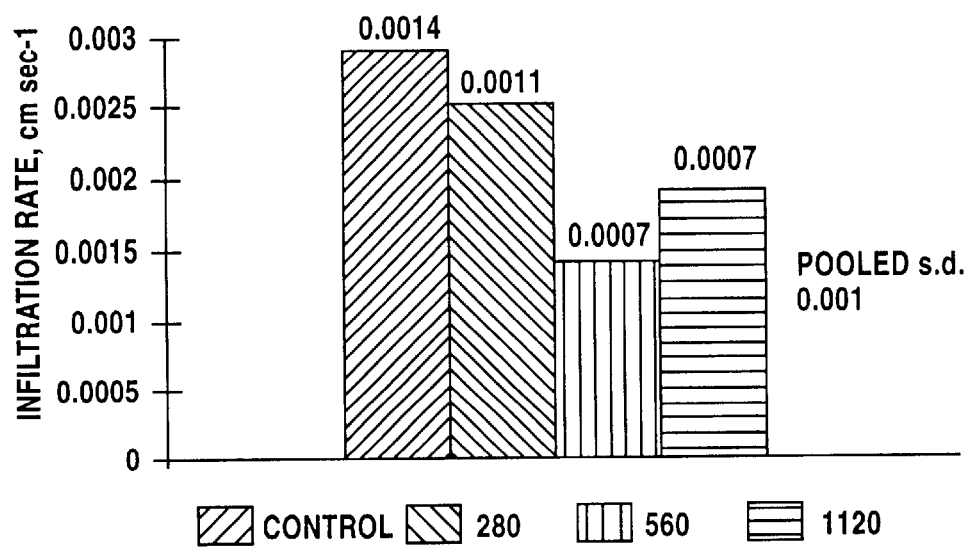
FIG. 6 is a graph of effects of various fly-ash application rates on the germination of centipedegrass at different days after seeding.

Although fly-ash additions appear to have decreased the soil infiltration rate (Table 3, item F), there were no significant differences among the means (FIG. 5). The high variability in measured data, as indicated by the SDs especially for the control and 280 Mg ha$^{-1}$ rate, apparently contributed to the insignificance.

After replanting, germination counts of the centipede plant were conducted on four occasions. There were no significant differences among the treatments on the 28th day after planting, indicating the slow germination characteristic of this species (Table 4, item A). By the 35th day after planting, germination significantly improved for the control and 280 Mg ha$^{-1}$ rate over the two highest rates, i.e., 560 and 1,120 Mg ha$^{-1}$. The high rate detrimental effects lingered through the 43rd and 57th days after planting (Table 4, item A). Apparently the high electrical conductivity of the fly-ash (i.e., 2,370 to 3,350 $\mu$S cm$^-$) in the treated soil, especially at the two highest rates, was detrimental to the germination of this species. For the grass species, values for electrical conductivity higher than 3.0 dS m$^{-1}$ (~3.0 mmho cm$^{-1}$, or 3.0 mS cm$^{-1}$) in the soil solution, may be damaging to plant establishment due to increased osmotic potential and salinity. The change in germination may have also occurred because the plots with less fly-ash had more centipedegrass on them before the Apr. 1, 1994 retilling and reseeding. On the 43rd day after planting, ash application did not induce any significant retardation of the plant height (Table 4, item B). Likewise, the root length did not appear to be affected by any of the treatments at any time (Table 4, item C).

| Days | n | Control | (s.d.) | 280 | (s.d.) | 560 | (s.d.) | 1120 | (s.d.) | pool s.d. |
|---|---|---|---|---|---|---|---|---|---|---|
| A: Values represent plants germinating, per m$^2$ (extrapolated, actual area = 0.0929 m$^2$) at different days after planting | | | | | | | | | | |
| 28 | 4 | 304.1 | (180) | 244.9 | (113) | 161.5 | (45.6) | 215.3 | (170) | (138) |
| 35 | 8 | 496.4a | (297) | 473.6a | (120) | 234.1ab | (148) | 205.8b | (164) | (195) |
| 43 | 8 | 414.4a | (228) | 403.6a | (269) | 205.8ab | (65) | 108.9b | (62) | (182) |
| 57 | 8 | 565.1a | (206) | 406.4a | (155.1) | 156.1b | (63.3) | 153.4b | (86.1) | (139) |
| B: Plant height (cm) as affected by fly-ash rate (Mg ha$^{-1}$). Six plants were measured from each plot 43 days after planting | | | | | | | | | | |
| 43 | 24 | 2.88 | (1.32) | 3.27 | (1.22) | 2.73 | (1.29) | 2.13 | (0.74) | (1.17) |
| C: Root length (cm) as affected by fly-ash rate (Mg ha$^{-1}$). Six plants were measured from each plot, 43 and 62 days after planting | | | | | | | | | | |
| 43 | 24 | 3.38 | (1.08) | 3.42 | (1.61) | 2.96 | (0.94) | 2.92 | (0.89) | (1.17) |
| 62 | 24 | 6.68 | (1.6) | 5.9 | (1.22) | 6.6 | (1.91) | 6.1 | (2.35) | (1.82) |

Figure 7A:
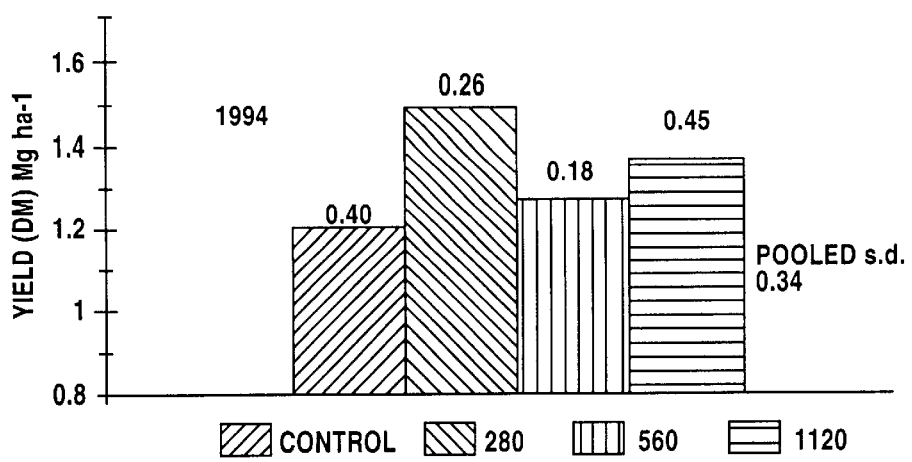
FIGS. 7A–7C are graphs of dry matter yield averages (Mg ha$^{-1}$) for each year (1994, 1995 and 1996) as influenced by the addition of various rates of fly-ash (Mg ha$^{-1}$)
Figure 7B:
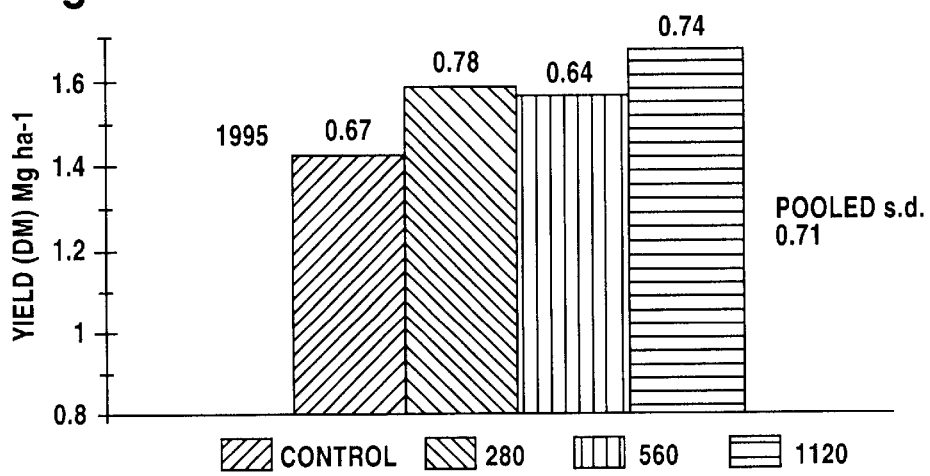
Figure 7C:
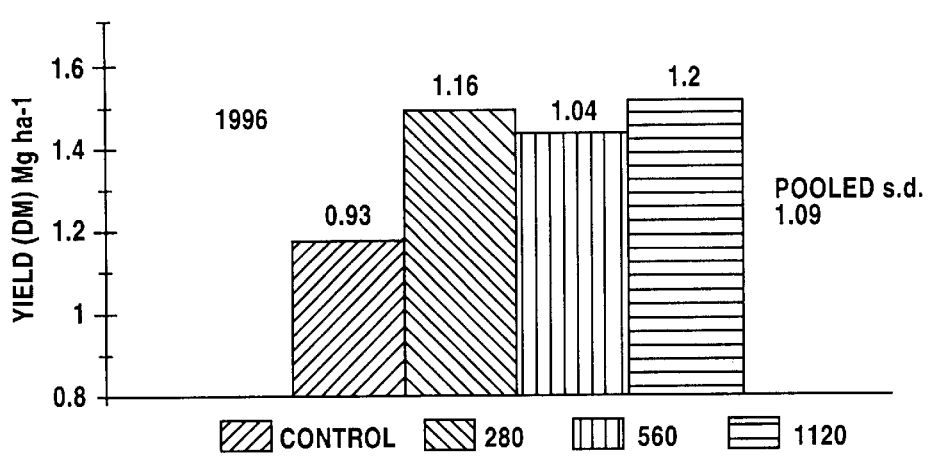

Dry matter data, taken as early as ~200 days after planting, indicate no significant differences (Table 5, items A and B; FIGS. 7A–7C) among the treatments. On the average, the yield hovered from 1.21 to 1.49 Mg ha$^{-1}$ in 1994, from 1.42 to 1.67 Mg ha$^{-1}$ in 1995, and from 1.18 to 1.52 Mg ha$^{-1}$ in 1996. Even between harvest time within a given year, i.e., two times in 1995 and three times in 1996, there were no significant differences among the treatments.

TABLE 5

| A. DM yield (Mg ha$^{-1}$) for each harvest | | | | | | | | | | | |
| Year | Time* | n | control | (s.d.) | 280 | (s.d.) | 560 | (s.d.) | 1120 | (s.d.) | pool s.d. |
|---|---|---|---|---|---|---|---|---|---|---|---|
| 1994 | 1 | 4 | 1.21 | (0.39) | 1.49 | (0.25) | 1.28 | (0.18) | 1.37 | (0.44) | (0.33) |
| 1995 | 2 | 4 | 1.86 | (0.50) | 2.04 | (0.73) | 2.15 | (0.11) | 2.32 | (0.38) | (0.48) |
| 1995 | 3 | 3 | 0.83 | (0.18) | 0.95 | (0.05) | 0.97 | (0.06) | 1.03 | (0.19) | (0.14) |
| 1996 | 4 | 4 | 0.81 | (0.14) | 0.93 | (0.24) | 0.89 | (0.12) | 1.00 | (0.26) | (0.20) |
| 1996 | 5 | 4 | 2.13 | (1.11) | 2.94 | (0.82) | 2.78 | (0.57) | 2.90 | (1.11) | (0.93) |

TABLE 5-continued

| 1996 | 6 | 4 | 0.58 | (0.09) | 0.63 | (0.15) | 0.65 | (0.08) | 0.64 | (0.19) | (0.14) |

B. Yearly yield averages (Mg ha$^{-1}$) of DM.

| Year | n | Control | (s.d.) | 280 | (s.d.) | 560 | (s.d.) | 1120 | (s.d.) | pool s.d. |
|---|---|---|---|---|---|---|---|---|---|---|
| 1994 | 4 | 1.21 | (0.39) | 1.49 | (0.25) | 1.28 | (0.18) | 1.37 | (0.44) | (0.33) |
| 1995 | 7 | 1.42 | (0.66) | 1.58 | (0.78) | 1.56 | (0.63) | 1.67 | (0.74) | (0.71) |
| 1996 | 12 | 1.18 | (0.92) | 1.50 | (1.16) | 1.44 | (1.03) | 1.52 | (1.20) | (1.08) |

*The harvest dates are 10/17/94, 7/14/95, 11/15/95, 6/19/96, 8/16/96, and 10/25/96. Before each harvest, plots were mowed and grass clippings removed on 9/7/94, 6/8/95, 10/3/95, 5/31/96, 7/18/96, and 9/20/96.

The elemental composition of plant tissue was grouped according to the physiological/nutritional functions of the elements measured: the macronutrients (N, P, and K), the secondary nutrients (Ca and Mg), the micronutrients (B, Cu, Fe, Mn, Zn, and Mo), the trace elements (Ag, As, Be, Cd, Cr, Hg, Ni, Pb, Sb, Se, and Ti), and the miscellaneous elements (Al, Ba, and Na). Sulfur, a secondary nutrient, although expected to occur at substantial quantity in this particular fly-ash, was not included in the analysis because of the difficulty with the ICP analysis. With the exception of Se, the trace elements mentioned above were listed by the Department of Health and Environment Control of South Carolina as "of environmental concern" metals from solid wastes, hence their inclusion in the plant, soil, and water analyses.

A summary of plant tissues analyses (1994–96) revealed the following:

1. There was no effect (statistically) of fly-ash application on N, K, Cu, Fe, B, Ag, Cd, Cr, Hg, Ni, Pb, Sb, Tl, Na, and Al contents in plant tissue;
2. Fly-ash applications significantly increased Ca, Mo, As, Be, Se, and Ba contents in plant tissue (see FIGS. 8A and 8B); and
3. Fly-ash application significantly reduced Mg, Mn, and Zn contents in plant tissue.

Looking at individual elements by year, the following trends are revealed:

1. N, P, K, Ca, Mn, Fe, Ag, As, B, Ba, Be, Cd, Cu, Cr, Hg, Ni, Pb, Sb, Tl, Al, Na, and Zn contents in plant tissue did not change with time (1994–96) statistically (FIG. 9A);
2. Mg, Mo, and Cu contents in plant tissues increased with time (FIG. 9B);
3. B intended to peak in the second year and decreased the following year (FIG. 10A);
4. Mn (FIG. 10B) and Se contents of plant tissue appeared to have decreased with time. (Note: Mn decline was not statistically significant.)

Although there were significant differences among treatment means for N, this cannot be attributed to fly-ash treatment as this material is expected to contain insignificant amounts of this nutrient. Phosphorus in plant tissue increased with time for the Control and 280 Mg ha$^{-1}$ treatments. This increasing trend in P uptake is contradictory to the common belief that since fly-ash is virtually a ferroaluminosilicate mineral, this nutrient might be rendered unavailable for plant uptake by virtue of it being fixed by the ash solid phases. Insoluble forms of P may result due to the high levels of Ca and/or Fe and Al in fly-ashes, which may induce P deficiency in plants. The differences among the means for K were not significant despite its tendency to increase with ash addition. Furthermore, the means within a treatment did not change with time. Although the pH (7.98–8.06) of the ash used was in the alkaline range, there was no significant differences in plant content of Ca induced by ash addition, nor was there any trend for this ion to change with time. Magnesium content in plant tissue diminished with the application rate, but tended to have increased in plant tissue with time for each rate. Why Mg behaved differently from Ca in plant nutrition under this experimental condition is not clear.

Copper and Fe are the only micronutrients in plant tissue not affected by the ash application, although the former appear to have increased with time. As expected, B and Mo contents increased with application rate, but only Mo increased with time. However, since B is a soluble salt, most of it appeared to have been leached from the top soil (i.e, root zone) after the 1995 season as indicated by values for treated samples being similar to that for the control. This soil dissipation, however, did not parallel the plant tissue content of B. On the other hand, Mo substantially increased with time, especially with the 560 and 1,120 Mg ha$^{-1}$ rates, where its contents more than doubled during the 3$^{rd}$ year over the previous year. Manganese content not only significantly decreased with application rate but also tended to decline with time. Whether this temporal and rate-related diminution is due to ash alteration of Mn chemistry in the soil can not be ascertained. This observation, however, is consistent with previous findings where Mn contents in tree tissues diminished when the trees were grown on fly-ash dominated substrate. Like Mn, Zn content diminished with application rate and tended to decline with time.

Among the trace elements, As, Be, and Se contents in plant tissues were substantially increased by fly-ash application but unlike the first two, Se content diminished with time.

Aluminum content did not display any discernible trend with rate or time, in spite of its high abundance in the fly-ash matrix. Barium and to some extent Na content increased with treatment rate, but indicate contrasting bioavailability from fly-ash with time as indicated by increasing trend for Ba and a diminishing trend for Na, especially at the highest rate.

The pH data indicate that the fly-ash used had some "lime equivalence" as the pH for the 0–15 cm depth increased from 4.89 for the control to 6.45 for the highest rate in 1993 (FIGS. 11A and 11B). The pH increased with increasing fly-ash rate, with the highest increase observed for the 1,120 Mg ha$^{-1}$ rate. Most of the pH increase was observed for the 0–15 cm depth, although some increase for the next depth increment, i.e., 15–30 cm, was later observed in 1995 and 1996 (FIGS. 12A and 12B). No further increases in pH were discernible for deeper depths. The data indicate that the "liming" effect occurred primarily at the depth of application.

The data on electrical conductivity (E.C.) (FIGS. 13A and 13B) indicate the following patterns.

1. The E.C. of the soil extracts increased with ash application rate, the highest occurring at the 1,120 Mg ha$^{-1}$ rate;

2. The largest increases occurred during the initial year application, i.e., 1993, and in the 0–15 cm depth;

3. Most of the soluble salts for the ash had already leached into the soil profile even during the initial year and progressively leached into deeper depths, most notably in 1994 (FIGS. 13A and 13B);

4. By the $3^{rd}$ year, the salinity in all soil depths had dramatically dissipated, although the levels up to the 152 cm depth were still higher than those for the control soil (FIGS. 14A and 14B); and 5. By the $4^{th}$ year, the ash effect on salinity at any ash rate and soil depth had all dissipated, with all values becoming similar to those for the control.

The E.C. data indicates that after 3 years of exposure to rainfall and sprinkled irrigation water, the soluble salts from the treatment zone had virtually leached through the soil profile and into the groundwater. The E.C. values for the groundwater from the treated plots were statistically similar to those from the control plots, possibly due to some dilution of the soil solution (or leachates) by the groundwater, or mixing by lateral movement of the groundwater along the hydraulic gradient across the plot area.

It is widely known from soil analysis of nutrients (and other elements) and from crop nutrition water that the levels in the soil extractable fractions should correlate with plant contents. Hence, the soil tests prior to planting crops are done to ascertain if any nutrients should be added to the soil to ensure proper plant nutrition. Analysis of the soil in the extractable form of elements relative to their respective contents in plant tissue indicate the following:

1. The increase in extractable form Al, Be, Ca, and Mo in the 0–15 cm depth with ash application strongly (but not significantly) parallels their contents in plant tissues. The correlation coefficients were 0.668, 0.728, 0.657, and 0.747 for the above elements, respectively;

2. The apparent increase in extractable form of Mg in the 0–15 cm depth with ash application is inconsistent with its declining trend in plant tissue;

3. The decrease in extractable form of Mn in the 0–15 cm depth with ash application significantly parallels its decline in plant tissue (r=0.912, p=0.0001); and 4. Increases in the extractable fraction of K, Cu, Fe, Cd, Cr, Ni, and Al in the top soil increment with ash application were not similarly expressed (i.e., poor correlations) in the plant tissue.

Among the parameters measured for groundwater samples, only electrical conductivity had some discernible trend, but not statistically significant with application rate and time. There were no detectable changes caused by the fly-ash at any time on pH, Ag, Al, As, B, Ba, Be, Cd, Cr, Cu, Fe, Hg, Mo, Ni, Pb, Sb, Tl, and Zn. It was not uncommon to have the concentrations of trace elements at about or below their detection limits.

Certain properties and factors of coal combustion by-products that may influence their value for land application use are listed in Table 6. They are grouped into "favorable" and "potentially detrimental" categories. These properties and factors should become more relevant as the application rate increases to higher levels, as in this study.

TABLE 6

Favorable:

1. Calcium carbonate equivalency, especially for Type C fly-ash
2. Pozzolanic reactions
3. Silt size particles
4. Presence of calcium and potassium sulfate
5. Presence of micronutrients
6. Buffering capacity
7. Mitigation of aluminum toxicity, especially in subsoils Potentially detrimental:

1. Presence of B and soluble salts especially in unweathered materials
2. Long-term availability of Mo, Se, and possibly As
3. Presence of calcium sulfite, especially in unweathered FGD products
4. High calcium carbonate equivalency in certain products
5. Potential micronutrient deficiency and other nutrient imbalance
6. Potential sodicity
7. Reduced infiltration and percolation in some cases
8. Highly erosive
9. Economics of handling, delivery, and application
10. Restrictive regulations There are several potential benefits of applying large amounts of fly-ash to agricultural/horticultural soils. The can be classified as either physical or chemical. Physical benefits include improved textural composition that can enhance the soil's water retention capacity. The addition, the dominance of silt-size particles in fly-ash promotes better aeration, percolation, and possibly infiltration of water into and from the treated zone. Chemical benefits may ensue from the presence of essential plant nutrients for crop production (e.g., supplying Mo to Mo-deficient soil) or by modifying the soil to provide a more favorable substrate for plant growth (e.g., increasing soil pH, increasing soil buffering capacity, countering soil sodicity, etc.).

All naturally occurring elements in coal may be found in fly-ash but because of the inherent variability of the chemical composition of coal, the chemical composition of fly-ash also varies widely. Eastern U.S. coals are generally bituminous and sub-bituminous, are characteristically high in sulfur, and have relatively low calcium carbonate equivalency of less than 1. This fly-ash, however, still substantially elevated the soil pH over the control soil and sustained its buffering capacity until 1996, the $4^{th}$ year of study. For example, the highest increase in pH to approximately 6.45 induced by the 1,120 Mg ha$^{-1}$ rate in 1993 was still at this level (i.e., 6.48 pH) in 1996.

In addition to enhancing the alkalinity and buffering capacity of soils, perhaps one of the most important features of fly-ash is its beneficial effect on the physical properties of the soil. The texture of fly-ash resembles that of a silt and loam soil. The WHC of soils of different textures has been shown to be positively correlated with the percentage of fine sand (0.02 to 0.2 mm) and organic C and negatively correlated with the percentage of coarse sand (0.2 to 2 mm). Because of the dominance of silt-size particles in this fly-ash (i.e., 60%), the water-retention capacity in sandy soils and plant-soil-water relations in clayey soils are enhanced. The WHC and PAW of the Congaree silt loam in the experiment was substantially enhanced by the fly-ash treatment, although the infiltration rate was not improved. In addition to the treated soil being less susceptible to drought, the soil held together better when the centipedegrass was harvested.

In drought-prone soils (i.e., coarse-textured soil) or soils that exhibit water ponding, fly-ash application induces permanent physical modification of the soil, which significantly increases potential plant yields. In turfgrass production, sod harvesting removes approximately 1 cm of ashed soil annually. Thus, the enhanced water retention capacity of the treated soil in accordance with the present invention should linger for at least 20 years (i.e., 0–20 cm preferred treated depth).

The unweathered fly-ash was spread over each individual plot according to the rate, rototilled, and left to "weather" until the next spring. The weathering exposure was done, since it was noted initially that very little germination, or mixing of the fly-ash occurred on the treated plots. The ash was again rototilled more thoroughly before replanting. The ash was subjected to natural weathering before replanting to allow leaching of soluble salts, including B from the treated layer. Analysis of soil samples taken 27 days after application indicate still high levels of soluble salts, including B, especially at the 560 and 1,120 Mg ha$^{-1}$ rates. By the next sampling, the E.C. and B, especially of the 1,120 Mg ha$^{-1}$ rate, had not substantially diminished. This may explain the rather poor initial plant establishment, as indicated by the germination count, especially at the 1,120 Mg ha$^{-1}$ rate, even after 57 days since replanting. This initial detrimental effect however, including the highest application rate, was no longer observed during the first biomass harvest in this experiment. Soluble salt concentrations in unweathered ash are generally very high, values far exceed the levels considered to cause adverse effects for most plant species, including agronomic and horticultural crops. Salinity problems usually do not occur in plants until the soil E.C. values are greater than about 1.5, 3.5 or 6.5 (sensitive to moderately sensitive to tolerant species) dS m$^-$.

In addition to direct effects on plant establishment by phytotoxic constituents in unweathered ashes, indirect effects due to inhibited microbial activity by high pH, toxic trace metals (Cd, Cr, Zn, etc.), and high soluble salts of fly-ashes can also occur.

The bioavailable form of secondary nutrients Ca and Mg was differently affected in the treated soil, where substantially more extractable Ca was generated by ash application relative to extractable Mg. This disparity however, in soil level between the two nutrients was not translated to their respective plant tissue contents. While Ca remained fairly constant in plant tissue across treatment and years, Mg significantly decreased with application rate, especially at the 1,120 Mg ha$^{-1}$ rate. This indicates that the interaction (i.e., imbalance) between Ca and Mg did not occur within the plant, but rather in the rhizosphere. Apparently, the dominance of Ca$^{2+}$ ions on the root surface hindered the absorption of Mg$^{2+}$ ions, and possibly other ions, by the roots. It should be noted however, that no visual symptoms of Mg deficiency were observed throughout the experimental period.

It is a common belief that fly-ash is rich in Ca and Mg and therefore can be used as a soil amendment for liming purposes and to enhance the bioavailability of Ca and Mg. While it has been observed that fly-ash application, including eastern U.S. ashes, generally improves the extractable Ca level in soils and plants, the present experiment indicates that may not be true for Mg nutrition. Magnesium deficiency induction can be a potential problem in certain situations. Application of FGD by-products originating from power stations using Ca-based sorbents can create an imbalance in Ca/Mg nutrition, inducing Mg deficiency.

Although no apparent imbalance between Ca and Mn, and Ca and Zn in the plant can be discerned in this experiment, high extractable soil Ca levels could promote the interaction of Ca$^{2+}$ with Mn$^{2+}$ and Zn$^{2+}$ in the rhizosphere, as indicated by the Mn and Zn plant contents for 1995–96. These nutritional declining patterns have also been observed earlier for Mn and Zn.

Fly-ash can serve as a supplementary source of certain essential trace elements for plant and/or animal nutrition, such as B, Se, and Mo. Although a micronutrient, B is phytotoxic at high soil levels. Because B in soil is fairly soluble and leachable, however, this phytotoxic effect is only temporary in unweathered ash. Because B and soluble salts in unweathered ash by-products might restrict seed germination and establishment of plants especially at high rates of application, unweathered materials (i.e., unponded fly-ash) should be allowed to "weather" to enable leaching of these harmful constituents. This implies that the timing of planting is important to avoid potential salt-related problems. Soil tests for electrical conductivity and B level can be conducted to determine when to plant.

In soils, Se, Mo, and As occur in anionic forms. Uptake of these elements by the centipedegrass on ashed soils was significantly increased. Their enhanced bioavailability apparently persisted over the study period. Arsenic is essential for animal nutrition, but not for plant growth, while Se is essential only for plant growth. Molybdenum is essential for both plant and animal nutrition, while Se is essential only for animal growth. While less is known about the role and proper amounts of As in animal nutrition, Se and Mo are required only in trace amounts in animal diet. For example, recommended feed concentrations to provide proper animal nutrition range from 0.1 to 1 mg Se kg$^{-1}$ dry weight. Feed concentrations with over 5 mg kg$^{-1}$ Se can be detrimental, if this feed makes up 100% of the animal ration. Feed concentrations of Se below 0.01 mg kg$^{-1}$ however, are also potentially detrimental, as these levels are deficient. As with Se, the range of safe concentrations for Mo is also narrow. Values below 0.1 mg kg$^{-1}$ of Mo in plant dry matter are regarded as deficient. Most animals require <1.0 mg Mo kg$^{-1}$ in their diet and most can tolerate Mo dietary levels of >6 mg kg$^{-1}$, if Cu in the same diet is not limiting. But when Cu is low (e.g., <4 mg kg$^{-1}$) 5 mg kg$^{-1}$ Mo or more could adversely affect livestock health. Hence, the designation of the term Mo-induced Cu deficiency or molybdenosis. Due to the concern for potential long-term bioavailability of As, Mo, and Se in the food chain for a high rate application, a turfgrass farm was chosen for the present invention, since the turf dry matter is not harvested for animal consumption.

Very high rates of fly-ash were applied in the experiments with the initial hypothesis that the tolerant nature of the centipedegrass used would preclude any phytotoxicity from excessive soluble salts, including B. Indeed normal plant establishment was achieved after spreading the fly-ash on the experimental plots and allowing weathering to induce leaching of the salts. The 4.5 kg ha$^{-1}$ limit for B per SC-DHEC Chapter 61 Rules was exceeded by all the ash rates (i.e., 5.9, 11.8, and 23.6 kg ha$^{-1}$ hot-water soluble B, respectively for 280, 560, and 1120 Mg ha$^{-1}$ rates). These amounts, however, were based on the unweathered material. Of the metals (As, Cd, Cu, Pb, Hg, Ni, Se, and Zn) included in Chapter 61 Rules, only the cumulative lifetime loading limit for As, listed at 41 kg ha$^{-1}$, was exceeded by the 560 Mg ha$^{-1}$ rate (i.e., 70 kg ha$^{-1}$) and by the 1,120 Mg ha$^{-1}$ rate (i.e., 140 kg ha$^{-1}$) (FIGS. 9A and 9B). These high rates, however, did not result in adverse effect on the quality of plant tissue or groundwater. The treatment rates used in this study exceeded SC-DHEC application limit of 22.4 Mg ha$^{-1}$ yr$^{-1}$ (10 ton a$^{-1}$ yr$^{-1}$) for Class I solid waste on cultivated croplands or forested lands. The primary environmental indicators, plant tissue and groundwater quality, however, indicate that much higher rates of fly ash, as those employed in the present invention, can be used in this kind of land use scenario where the grown species, centipedegrass, is known for its soluble salt tolerance and which does not bioaccumulate potentially toxic trace elements. In addition, the harvested plant material is not used as a feed for livestock and other animals.

It should be apparent from the present invention that turf farms appear to be viable utilization venue for CCBP due to the following observations: the pH of treated soil fell within a favorable range for plant growth; the centipedegrass grew normally; the plant tissue and groundwater chemical composition did not deteriorate; and the soil levels of even potentially toxic trace elements did not prove to be detrimental to plant tissue and groundwater quality.

What is claimed is:

1. A method of growing turfgrass, comprising:
  applying precipitator coal fly ash to an existing sandy or clayey soil in an amount of at least about 280 Mg $ha^{-1}$;
  mixing the applied coal fly ash into the existing soil to a depth of at least about 8 inches to prepare a mixed soil; and
  establishing a turfgrass on the mixed soil, wherein the coal fly ash is weathered prior to establishing said turfgass so that an amount of boron has decreased below about 2 mg per kg coal fly ash, and a level of salinity has decreased below about 1.5 deciSiemens per meter.

2. The method of claim 1, wherein the mixed soil is allowed to weather prior to establishing the turfgrass.

3. The method of claim 1, wherein the coal-fly ash has been weathered prior to the mixing step.

4. The method of claim 2, wherein the mixed soil is weathered for at least about 4 to 5 months prior to establishing the turfgrass.

5. The method of claim 3, wherein the coal fly ash is weathered for at least about 5 to 6 months.

6. The method of claim 1, wherein the coal fly ash is applied to the existing soil in an amount from about 280 Mg $ha^{-1}$ to about 1120 Mg $ha^{-1}$.

7. The method of claim 1, further comprising the step of harvesting sod containing the turfgrass after establishment of said turfgrass.

8. The method of claim 7, further comprising the step of establishing another turfgrass on the mixed soil after harvesting said sod.

9. The method of claim 7, wherein the turfgrass is centipedegrass.

* * * * *